United States Patent
Masui et al.

(10) Patent No.: US 6,924,663 B2
(45) Date of Patent: Aug. 2, 2005

(54) PROGRAMMABLE LOGIC DEVICE WITH FERROELECTRIC CONFIGURATION MEMORIES

(75) Inventors: Shoichi Masui, Kawasaki (JP); Michiya Oura, Kawasaki (JP); Tsuzumi Ninomiya, Kawasaki (JP); Wataru Yokozeki, Kawasaki (JP); Kenji Mukaida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 10/327,653

(22) Filed: Dec. 24, 2002

(65) Prior Publication Data

US 2003/0122578 A1 Jul. 3, 2003

(30) Foreign Application Priority Data

Dec. 28, 2001 (JP) .......................................... 2001-399326
Dec. 28, 2001 (JP) .......................................... 2001-399390

(51) Int. Cl.[7] .......................... H03K 19/173; G11C 7/00
(52) U.S. Cl. ................................ 326/38; 326/40; 326/8; 365/189.05; 365/189.02
(58) Field of Search ................................. 326/8, 38–41; 365/189.05, 189.08, 189.02, 230.05

(56) References Cited

U.S. PATENT DOCUMENTS

| | | | | |
|---|---|---|---|---|
| 4,642,487 A | | 2/1987 | Carter | |
| 5,426,378 A | * | 6/1995 | Ong | 326/39 |
| 5,898,317 A | | 4/1999 | Gardner et al. | |
| 6,011,730 A | * | 1/2000 | Sample et al. | 365/189.05 |
| 6,025,735 A | | 2/2000 | Gardner et al. | |
| 6,124,728 A | * | 9/2000 | Nishimura et al. | 326/38 |
| 6,145,020 A | * | 11/2000 | Barnett | 710/8 |
| 6,326,651 B1 | | 12/2001 | Manabe | |
| 6,157,979 A1 | | 12/2002 | Barnett | |

FOREIGN PATENT DOCUMENTS

JP      3121862      10/2000

* cited by examiner

Primary Examiner—Vibol Tan
(74) Attorney, Agent, or Firm—Arent Fox PLLC

(57) ABSTRACT

A programmable logic device with ferroelectric configuration memories storing multiple configuration data sets. The device has programmable logic blocks, interconnections, and I/O blocks to provide desired logic functions. Those building blocks can be dynamically reconfigured by changing the selection of configuration data stored in the device's integral configuration memories. The configuration memories are divided into groups, so that they can be loaded concurrently with multiple configuration data streams. To protect the content of configuration memories from unauthorized access, the device employs an authentication mechanism that uses security IDs stored in the configuration memories. The device has a memory controller to provide an appropriate power supply sequence for ferroelectric memory cells to ensure the reliable data retention when the device is powered up or shut down.

23 Claims, 30 Drawing Sheets

| OPERATION | WE | WL(x) | PL(PL1,PL2) |
|---|---|---|---|
| WRITE | High | High | High → Low |
| READ | Low | High | Vdd/2 |
| RETAIN | Low | Low | Vdd/2 |

FIG. 8

| OPERATION | PWR | WE | WL(x) | PL |
|---|---|---|---|---|
| PRE-POWERUP STATE | OFF | Low | Low | Low |

FIG. 28

| OPERATION | PWR | WE | WL(x) | PL |
|---|---|---|---|---|
| STORE MEMORY | On | Low | Low | High→ Low |
| WAIT SHUTDOWN | On | Low | Low | Low |

FIG. 30

PROGRAMMABLE LOGIC DEVICE WITH FERROELECTRIC CONFIGURATION MEMORIES

CROSS-REFERENCE TO RELATED APPLICATIONS

This application is based upon and claims priority of Japanese Patent Application Nos.2001-399326, filed Dec. 28, 2001 and 2001-399390, filed Dec. 28, 2001, the contents being incorporated herein by reference.

BACKGROUND OF THE INVENTION

1. Field of the Invention

The present invention relates to programmable logic devices. More particularly, the present invention relates to a programmable logic device having ferroelectric memory cells as a non-volatile configuration memory to store the definitions of logic functions.

2. Description of the Related Art

Programmable logic devices are a class of integrated circuits that offer a vast array of configurable building blocks including logic gates for users to implement an application-specific function. Their fundamental elements include: logic blocks containing basic logic gates (which are sometimes implemented with look-up tables) and flip-flops, multiplexers, programmable interconnections for wiring between internal elements, and programmable input/output (I/O) blocks for implementing various I/O port configurations. They further have a configuration memory to store the definition of logical block functions, programmable interconnections, and programmable I/O block configurations. Such information is called "configuration data."

Programmable logic devices are generally categorized into three groups as follows. Devices in the first category have programmable logic blocks, interconnections, and I/O blocks, and their configuration memories are volatile; i.e., their data is lost upon power shutdown. Devices in the second category are similar to the first category in terms of functional structure, but their configuration data is non-volatile. In the third category, their logic blocks are designed on the basis of programmable logic array architectures, with non-volatile configuration storage.

As a specific example of the first category, the U.S. Pat. No. 4,642,487 discloses a programmable logic device employing a static random access memory (SRAM) to store its configuration data. Since the SRAM cells used in this device are volatile, the configuration data on the chip disappears when the power is removed. Additional non-volatile memories, such as programmable read-only memory (PROM) and erasable PROM (EPROM), are therefore necessary to store the configuration data for this type of device. When the device is powered up again, its configuration data should be restored from an external memory device to internal SRAM cells. The use of such an off-chip non-volatile memory raises the cost of products, besides consuming precious board space.

The above shortcomings of the first-category devices are solved in the second category of programmable logic devices which integrate non-voltage configuration data storage. In the second category, each device contains configuration data in its integral ferroelectric memory or magnetic random-access memory (MRAM), which are both non-volatile. One specific example is shown in the Japanese Patent No. 3121862, which proposes a programmable logic device with ferroelectric memories. Ferroelectric memory is particularly suitable for programmable logic device applications because of its advantage in operation speed. Other types of non-volatile memories such as PROM, EPROM, electrically erasable PROM (EEPROM), or flash memory are not used in the second category, since they require the integration of high-voltage transistors and their speed is insufficient to meet the needs of programmable logic devices.

Programmable logic devices that belong to the third category use EPROM, EEPROM, or flash memory as non-volatile configuration data storage, as in the second category. They are also called "Complex Programmable Logic Devices" (CPLD), as distinguished from the second category, which Stephen D. Brown et al. elaborate in their publication entitled "Field Programmable Gate Arrays" (Kluwar Academic Publishers).

The present invention aims at the programmable logic devices that belong to the first and second categories described above, which are collectively called "Field Programmable Gate Array" (FPGA). Conventional FPGAs, however, have some problems, one of which is a limitation in the number of logic gates per unit chip area. To cover this deficiency, researchers have studied such devices that can store multiple sets of configuration data. As distinguished from FPGA, this architecture is called "Dynamically Programmable Gate Array" (DPGA). For more details, refer to A. DeHon, "Dynamically Programmable Gate Arrays: A Step Toward Increased Computational Density," Fourth Canadian Workshop of Field-Programmable Devices, 1996.

The DPGAs mentioned above are a member of the first category of programmable logic devices since their configuration data is stored in a dynamic RAM (DRAM) which is volatile. With the DPGA architecture, we can virtually increase the number of logic gates implemented on a single device. One problem is, however, that the above publication tells us little about how to switch the configuration data. Another problem is, of course, that their configuration memory is volatile. This means that an external non-volatile memory is necessary, which makes the board design more difficult since it increases the component count, costs, and board space consumption. Yet another difficulty about DPGA is that no specific method of configuration switching is disclosed.

As a general problem with programmable logic devices, it is known that some improper internal connections could happen on power-up in the case the configuration memory has not been loaded with data. If two driver outputs in opposite logic states are wired together, the conflict could produce an undefined voltage level, resulting in a large current flow within a device. A possible countermeasure is to disable the output drivers of logic blocks each time the device is powered up, until the configuration data becomes ready (P. Chow et al., IEEE Transaction on Very Large Scale Integration Systems, vol.7, No.3, pp. 321–330, September 1999). This method of disabling output drivers has a side effect that a device cannot start operation immediately after power-up.

Also, in conventional programmable logic devices, loading of their configuration data often takes a long time to complete. The users wish for an improved data loading mechanism for this reason.

Configuration data of programmable logic devices is an asset of the company that developed it. Conventional devices, however, provide little security measures to protect such assets from stealing, tampering, or other unauthorized access. It is therefore desired to introduce a data protection mechanism into programmable logic devices.

The Japanese Patent No. 3,121,862 discloses a programmable logic device using ferroelectric random access memories. This programmable logic device, however, may fail to recall data out of ferroelectric memories in power-up, or may fail to store data in ferroelectric memories in power-down. T. Tamura et al. wrote a report that reveals some dynamic behaviors of ferroelectric capacitors (T. Tamura et al., ISIF Digest, p.1.2.2, 2001). That nature of capacitors could lead to a problem in recovering data from the polarization state of each ferroelectric capacitor, as a consequence of application of a rapidly rising voltage at the time of power-up. That is, configuration data stored in a ferroelectric memory could be destroyed on power-up, although it has to be non-volatile.

Also, to ensure the reliable retention of stored data, it is considered desirable to fully apply a supply voltage to ferroelectric SRAM cells before removing power from them. It is known, however, that a ferroelectric capacitor has a tendency to prefer one state over the other if a full supply voltage is applied to it for a long period of time. This "imprint" effect, a phenomenon due to a shift of the hysteresis loop, makes it difficult to write data to ferroelectric memory cells.

SUMMARY OF THE INVENTION

In view of the foregoing, it is an object of the present invention to provide a programmable logic device with a more efficient architecture that can increase the effective number of logic gates per unit chip area.

To accomplish the above object, the present invention provides a programmable logic device which performs logic functions according to given configuration data. This device comprises the following elements: a programmable logic block which provides a logic function as programmed; a plurality of configuration memories, each composed of non-volatile ferroelectric memory cells, which store a plurality of configuration data sets; and a data selector which selects one of the plurality of configuration data sets for use in the programmable logic block to define the logic function thereof. By switching the selection of a configuration data set, the device provides various logic functions with a single chip.

It is another object of the present invention to provide a programmable logic device which avoids unexpected behavior or internal signal conflict before the configuration data is loaded.

To accomplish the above object, the present invention provides a programmable logic device having a mechanism to avoid conflict in programmable interconnections. This device comprises the following elements: a programmable logic block which provides a logic function as programmed; a configuration memory composed of non-volatile ferroelectric memory cells which stores configuration data; a memory, composed of at least one non-volatile ferroelectric memory cell, which stores information that indicates whether the configuration memory has already been loaded with the configuration data; and a control circuit which disables outputs of the programmable logic block when the information in the memory indicates that the configuration memory has not been loaded.

It is yet another object of the present invention to provide a programmable logic device whose configuration data can be written in a shorter time.

To accomplish the above object, the present invention provides a programmable logic device with multiple configuration memories. In this device, the plurality of configuration memories are divided into a plurality of groups, and those groups of configuration memories receive a plurality of configuration data streams concurrently.

It is still another object of the present invention to provide a programmable logic device which guards its own configuration data against reverse engineering, tampering, or any other unauthorized access or use.

To accomplish the above object, the present invention provides a programmable logic device with security measures. This device comprises the following elements: a programmable logic block which provides a logic function as programmed; a configuration memory composed of non-volatile ferroelectric memory cells which stores configuration data that defines the logic function of the programmable logic block; a security data storage area which is provided as part of the configuration memory to store a security identifier; and an authentication processor which authenticates a request related to the configuration memory by using the security data stored in the security data storage area.

It is further an object of the present invention to provide a programmable logic device with a mechanism to ensure the reliable data retention characteristics of its integral ferroelectric configuration memory when the device is powered up or shut down.

To accomplish the above object, the present invention provides a programmable logic device with a circuit to control a power-up sequence. This device comprises the following elements: a programmable logic block which provides a logic function as programmed; a configuration memory composed of non-volatile ferroelectric memory cells which stores configuration data that defines the logic function of the programmable logic block; a supply voltage monitor which produces a detection signal when a supply voltage has reached a predetermined threshold voltage; and a memory controller which supplies power to the ferroelectric memory cells after applying a high-level voltage to a plate line of the ferroelectric memory cells in response to the detection signal from the supply voltage monitor.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 8 shows the state of control signals in each operation mode of a ferroelectric memory;

FIG. 28 shows the state of control signals before ferroelectric memory cells are energized;

FIG. 30 shows the state of control signals when ferroelectric memory cell are powered down.

DESCRIPTION OF THE PREFERRED EMBODIMENTS

Figure 1:
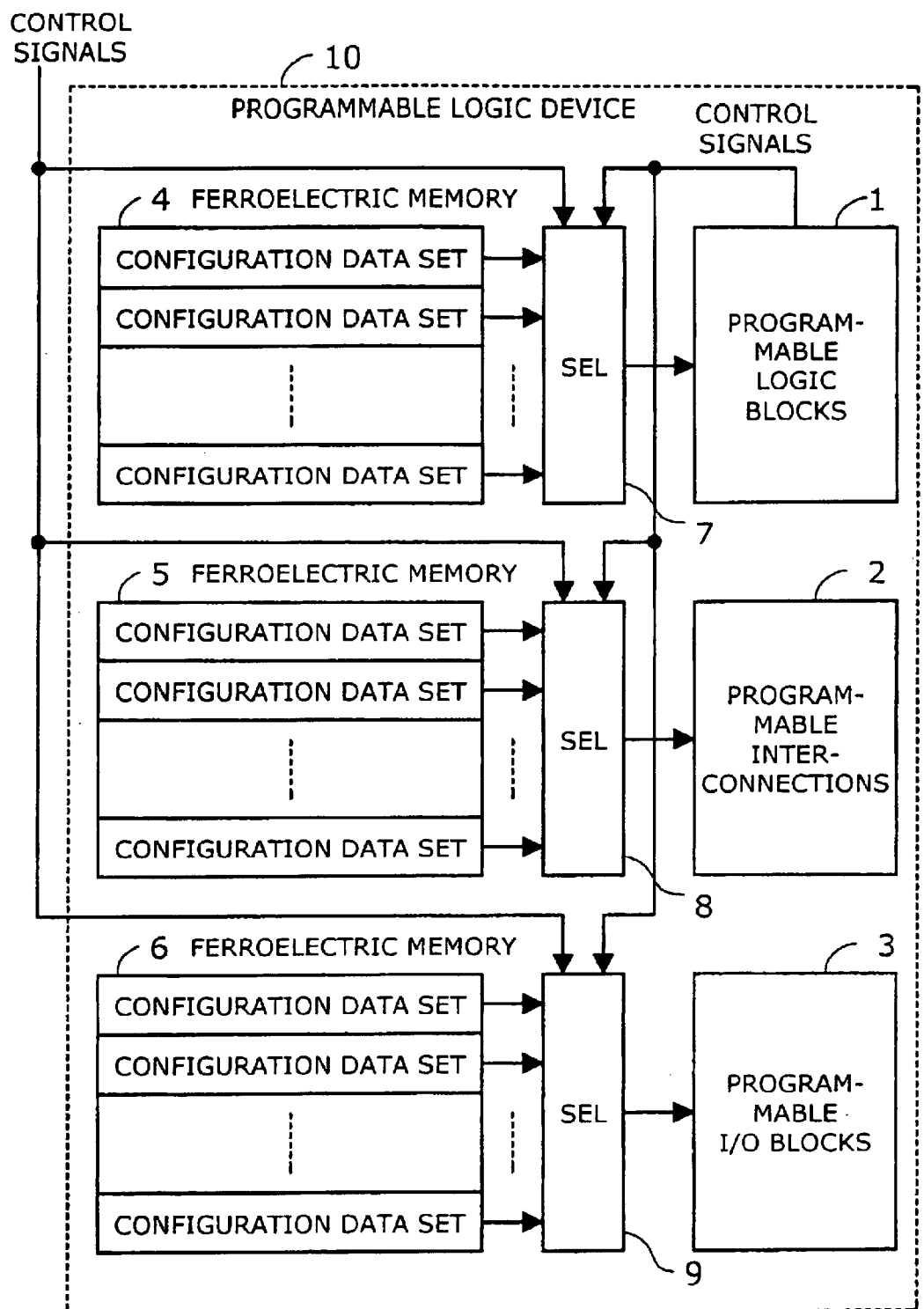
FIG. 1 shows a basic structure of a programmable logic device according to the present invention.

Preferred embodiments of the present invention will be described below with reference to the accompanying drawings, wherein like reference numerals refer to like elements throughout.

Referring to FIG. 1, we begin with describing the concept of the invention. FIG. 1 shows a basic structure of a programmable logic device 10 according to the present invention. This programmable logic device 10 has the following integral functional blocks: programmable logic blocks 1; programmable interconnections 2; programmable I/O blocks 3; ferroelectric memories 4, 5, and 6; and data selectors (SEL) 7, 8, and 9. The programmable logic blocks 1 are configurable to provide various logic functions according to given configuration data. The programmable interconnections 2 provide connection between programmable logic blocks 1 and programmable I/O blocks 3 in various ways. The programmable I/O blocks 3 offer configurable I/O port functions. The ferroelectric memories 4, 5, and 6 store the information that defines how to configure the programmable logic blocks 1, programmable interconnections 2, and programmable I/O blocks 3, respectively. The data selectors (SEL) 7, 8, and 9 supply those building blocks 1, 2, and 3 with one of a plurality of configuration data sets stored in their corresponding ferroelectric memories 4, 5, and 6, respectively. The above fundamental building blocks are combined as desired, to function as a DPGA or FPGA device.

The ferroelectric memories 4, 5, and 6 are used as non-volatile configuration memories. While conventional FPGAs need an external PROM or EEPROM to store their configuration data, the proposed programmable logic device 10 eliminates the need for such external components by integrating non-volatile configuration memories in the device itself and thus contributes to realizing a low-cost board system.

According to the present invention, each ferroelectric memory 4, 5, and 6 contains a plurality of configuration data sets, one of which is selected by the data selectors 7, 8, and 9 for use in the programmable logic blocks 1, programmable interconnections 2 and programmable I/O blocks 3. To make this selection, the data selectors 7, 8, and 9 are supplied control signals from the programmable logic blocks 1 and/or some external source outside the programmable logic device 10. With those multiple sets of configuration data on a single device, the illustrated architecture enables the device 10 to provide different logic functions with a single set of programmable logic blocks 1, programmable interconnections 2, and programmable I/O blocks 3. The number of logic gates per unit chip area is virtually increased, meaning that the present invention enables more efficient use of a limited chip area.

The programmable logic blocks 1 are composed of combinational logic circuit blocks (also called "look-up tables"), flip-flops, and multiplexers. Each flip-flop has an enable input, the state of which is controlled in conjunction with a selection signal supplied to its corresponding multiplexer, as will be described later in detail. This structure enables us to use the programmable logic blocks 1 more effectively.

According to the present invention, a part of the ferroelectric memories 4, 5, and 6 is made accessible to the programmed logic for reference as a read-only memory. This feature enables us to supply the programmable logic blocks 1 with fixed data as necessary, even when the chip area is too tight to integrate a dedicated ROM. With some amount of additional circuitry, the address space of this virtual read-only memory can be accessed in different contexts, which makes the logic design more flexible. The details of this feature will be described later in detail.

The present invention also enhances the durability of configuration data stored in the ferroelectric memories 4, 5, and 6 in transient conditions including power-up and power-down. That is, the proposed programmable logic device employs a source voltage monitor circuit that detects a sufficiently high voltage for the ferroelectric memories 4, 5, and 6 to accept control signals, or to begin data recall operations correctly, when the system power is turned on. When this predetermined threshold voltage level is reached, the programmable logic device 10 applies relevant control signals and supply voltage to the ferroelectric memories 4, 5, and 6, thus making itself ready to start the programmed logic operation.

When the power is removed, on the other hand, the source voltage monitor circuit finds that the voltage has fallen below another predetermined threshold. The ferroelectric memories 4, 5, and 6 then receive appropriate control signals before the power is completely lost, so that their contents will be preserved in both short-term and long-term conditions. As such, the proposed device 10 is designed to ensure the stable operation by controlling voltages and signals of the ferroelectric memories 4, 5, and 6 in an appropriate sequence, not to destroy the configuration data stored in them.

Further, according to the present invention, the programmable logic device 10 has another piece of ferroelectric memory to store the information about whether its configuration memories have already been programmed. This feature prevents different signals from being connected together in a conflicting fashion, as well as avoiding instability of surrounding logic circuits, before configuration data is written.

The proposed programmable logic device 10 has an enhanced data writing mechanism to write multiple configuration data in the ferroelectric memories 4, 5, and 6, which permits a plurality of configuration data streams to be transferred simultaneously to the configuration memory, even in parallel with the ongoing logic operation of the device. With multiple data paths for configuration data streams, the proposed device 10 can be programmed in a shorter time. Besides, the simultaneous background reconfiguration function enables the user to increase the effective number of logic gates by changing the device configuration on the fly.

Further, the present invention enables us to write a piece of unique information (called "security ID") into a nonvolatile ferroelectric memory for security management purposes. Before writing or reading configuration data to/from a programmable logic device, the device-specific information is consulted to authenticate the requesting party, thereby preventing the configuration data from being stolen or tampered. The security ID may also be used to determine whether to start up the programmed logic function. This security mechanism guards the device against unauthorized users.

Programmable Logic Device

Figure 2:
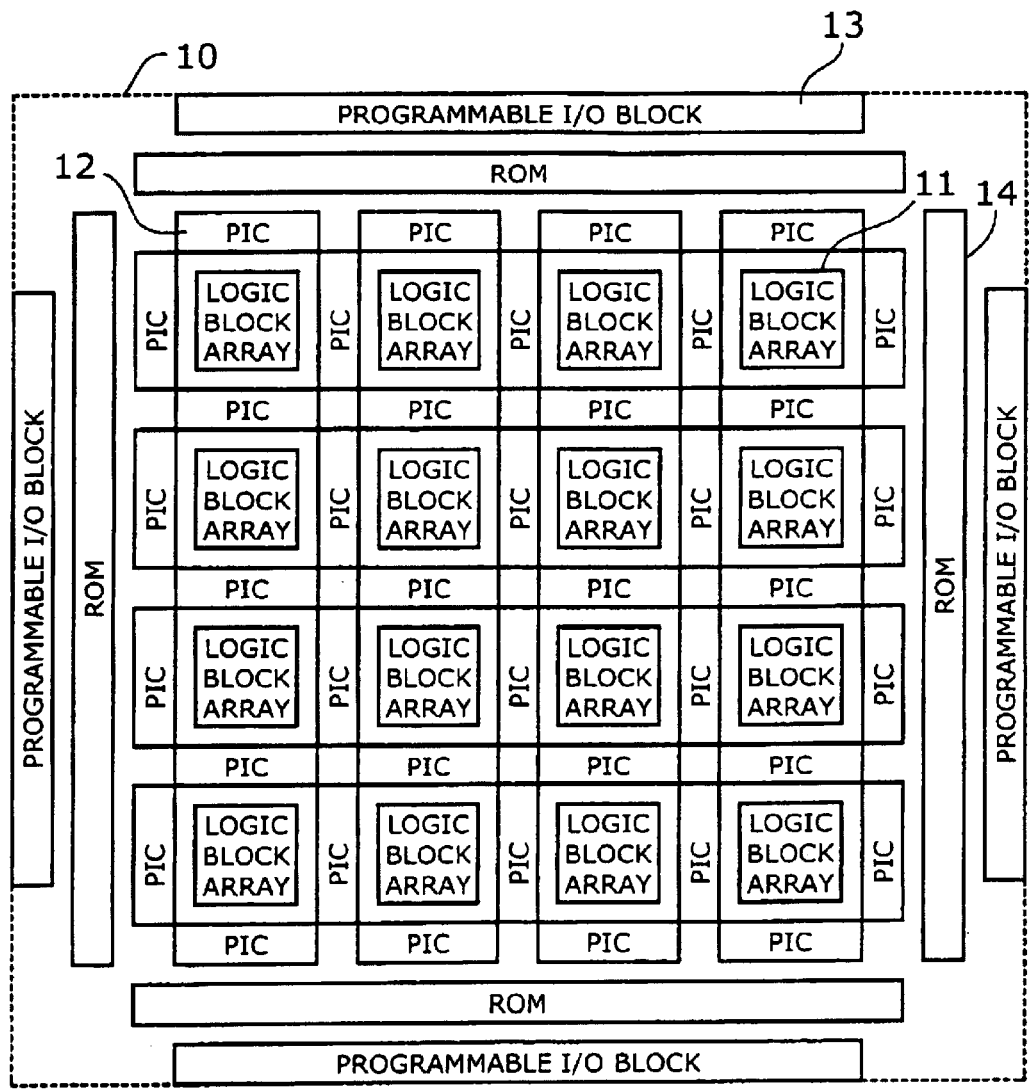
FIG. 2 is a simplified plan view which shows the entire structure of a programmable logic device with ferroelectric memories.

In this section, we will present a specific example of a programmable logic device as an embodiment of the present invention. FIG. 2 is a simplified plan view which shows the entire structure of a programmable logic device 10 with ferroelectric integral configuration memories. The central part of the illustrated device 10 is a matrix of logic block arrays 11, each of which provides a desired combinational logic circuit. These logic block arrays 11 are surrounded by a plurality of programmable interconnections (PIC) 12, which can be configured to provide desired wiring. On the outer regions of the chip, there are a plurality of programmable I/O blocks 13 corresponding to I/O pads (not shown) for wiring to the external connection terminals, or leads. We can program each terminal as an input or output of the device 10. Located between the programmable I/O blocks 13 and logic block arrays 11 are read-only memories 14, which are actually a part of the ferroelectric configuration memories.

Figure 3:
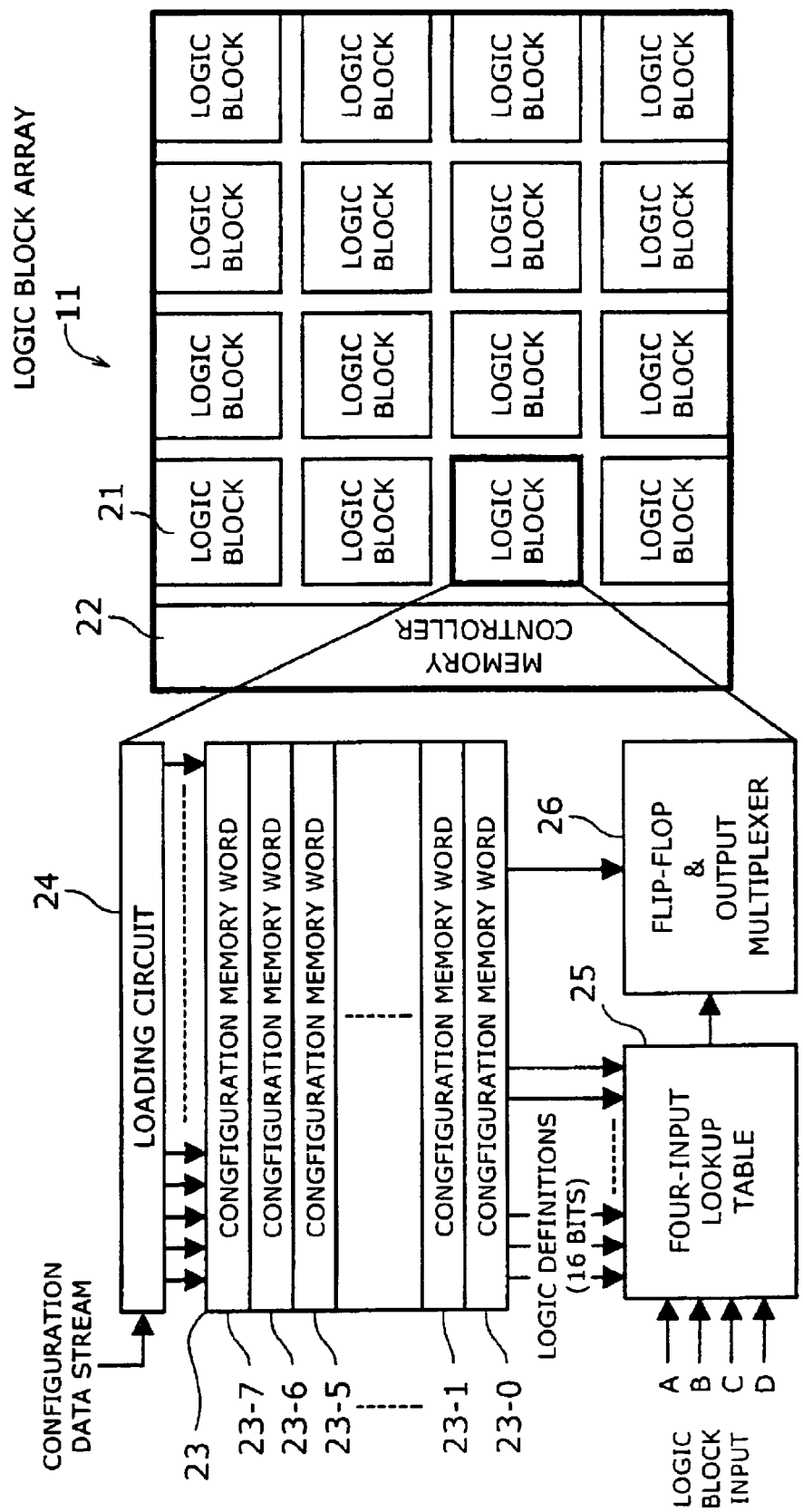
FIG. 3 is a block diagram which shows the details of a logic block array.

The details of each element of the programmable logic device 10 will now be described below. FIG. 3 is a block diagram which shows the details of a logic block array. The illustrated logic block array 11 contains sixteen logic blocks 21 and a memory controller 22. The left half of FIG. 3 gives specifics of one logic block 21, which include: an eight-word configuration memory 23 (including eight configuration memory words 23-0 to 23-7) composed of ferroelectric memory cells, a loading circuit 24 for writing configuration data to each configuration memory word 23-0 to 23-7, a four-input look-up table 25 for producing a combinational logic function, and a flip-flop & output multiplexer 26.

The loading circuit 24 contains a shift register with a length of, for example, 17 bits. The loading circuit 24 receives a serial configuration data stream from an external source, shifting it in a bitwise fashion, and when all the data bits are shifted in, it writes the resultant data word to the first configuration memory word 23-0. This memory loading cycle is repeated until the eighth configuration memory word 23-7 is finished.

Of all the eight configuration memory words 23-0 to 23-7, the first-loaded word 23-0 may preferably contain the initial configuration data that the logic block 21 is supposed to use first upon start-up. With such a setup, the device can start logic operation as soon as the first configuration memory word 23-0 is filled, while continuing load operation for the remaining words 23-1 to 23-7 in the background. In this way, we can reduce the time for loading memory and start up the device quickly.

Figure 4:
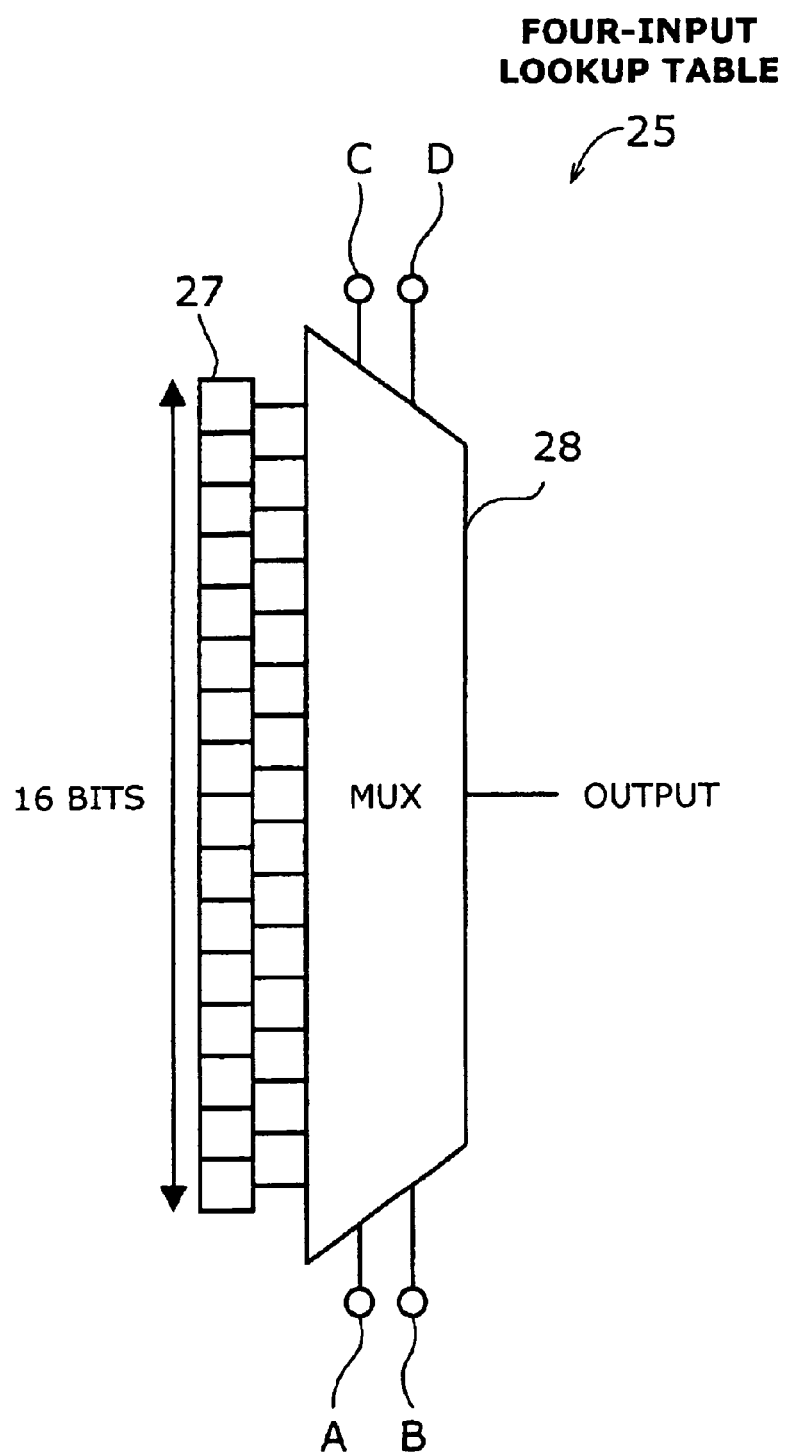
FIG. 4 shows an example of a four-input look-up table.

FIG. 4 shows an example of the four-input look-up table 25, which is composed of a 16-bit wide, single word memory 27 and a 16:1 multiplexer 28. The memory 27, composed of ordinary SRAM cells or ferroelectric memory cells, can receive eight different data patterns, one at a time, from the configuration memory 23 shown in FIG. 3. The multiplexer 28 selects one of sixteen outputs of the memory 27 according to its four-bit logic block input (A, B, C, D). By changing the data pattern in the memory 27, the look-up table 25 of FIG. 4 can produce any kind of combinational logic with up to four inputs, including the following functions, for instance: AND gate, NAND gate, AND gate with inverting inputs, OR gate, NOR gate, exclusive-OR gate, and AND-OR gate.

Suppose, for example, that the first configuration memory word 23-0 has a data pattern with a single bit set to one, followed by zeros, and that bit is to be selected when the logic block inputs are all ones. With this setup, the look-up table 25 now functions as a four-input AND gate. Likewise, the look-up table 25 can also be configured to serve as a four-input OR gate by programming the next configuration memory word 23-1 in an appropriate way and switching the configuration data to that word 23-1. Further, if the third configuration memory word 23-2 is programmed in an appropriate way and switching the configuration data to that word 23-2, then the look-up table 25 will provide a two-input logical OR function of (A+B), for example.

Generally speaking, configuration memory cells take up only a small area on the programmable logic device 10, compared to its wiring areas, which occupy the largest portion of the chip space. In this sense, additional configuration memories would not make much impact on the chip size. Stated more positively, it is fully justifiable to integrate more configuration memories for the purpose of increasing the effective number of logic gates that the programmable logic device 10 can virtually offer.

Figure 5:
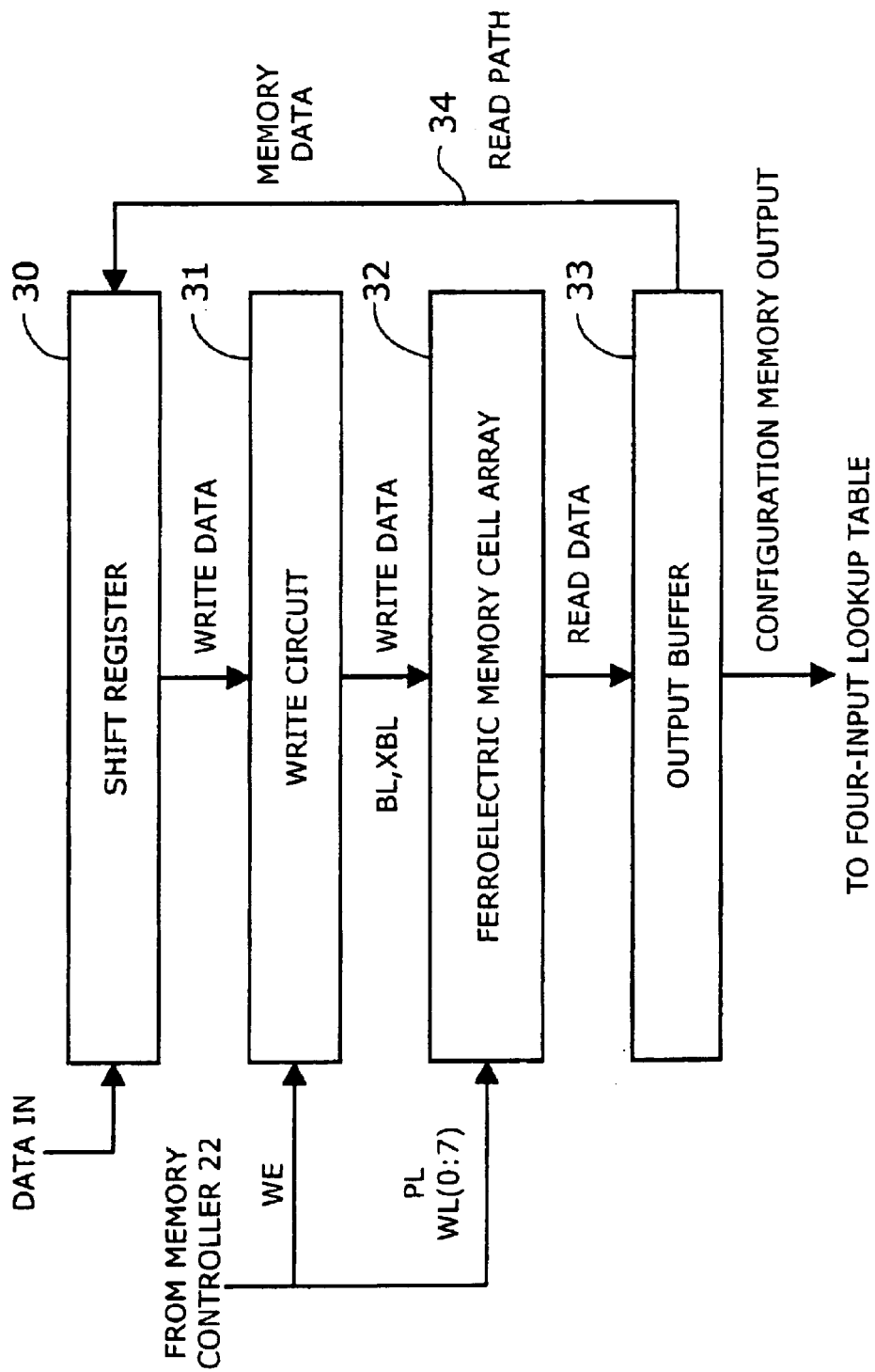
FIG. 5 shows an example of a loading circuit and configuration memory.

FIG. 5 shows a more specific structure of the loading circuit 24 and configuration memory 23. This part of the logic block array 11 has the following elements: a shift register 30, a write circuit 31, a ferroelectric memory cell array 32, and an output buffer 33. Here, the shift register 30 receives a configuration data stream and transfers it in parallel form. The write circuit 31 writes this data to ferroelectric memory cell array 32. The data in the ferroelectric memory cell array 32 is supplied to the multiplexer of the four-input look-up table 25 through the output buffer 33. There is a data read path 34 to route memory data back to the shift register 30. If required, the output buffer 33 may include sense amplifiers for reading out the memory content.

To control configuration memories, as well as to control write operation to ferroelectric memory cells constituting them, the memory controller 22 in the logic block array 11 (FIG. 3) supplies the write circuit 31 with a write enable signal (WE), and the ferroelectric memory cell array 32 with a plate line PL and word lines WL(0:7). The number of word lines WL depends on the number of configuration data sets, which is eight in the present example.

The above structure of the loading circuit 24 and configuration memory 23 can be applied not only to the logic blocks 21, but also to those in other building blocks, including the programmable interconnections 12 and programmable I/O blocks 13. Configuration data defines which wires to connect together in the programmable interconnections 12, and how to configure I/O ports in the programmable I/O blocks 13.

Figure 6:
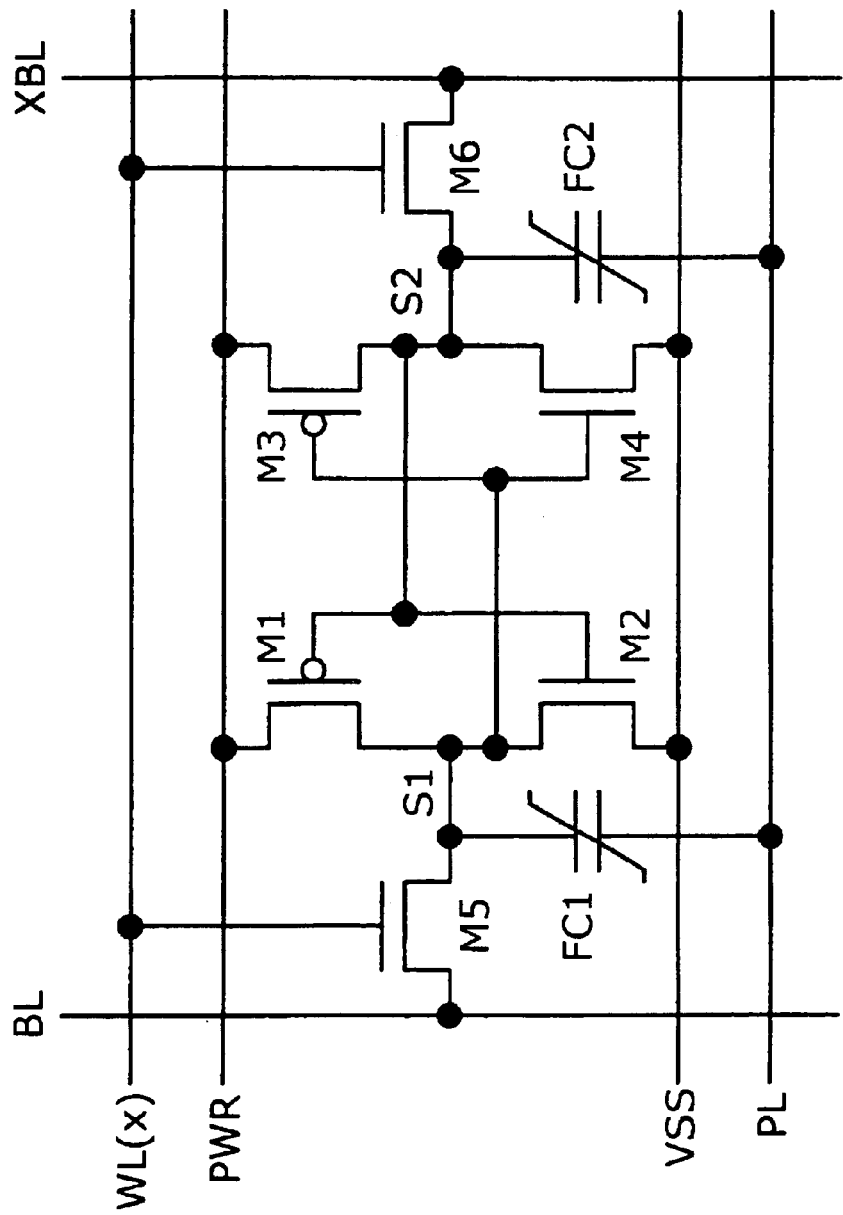
FIG. 6 is a schematic diagram showing a first type of ferroelectric memory cell.

There are two types of ferroelectric memory cells suitable for configuration memories. FIG. 6 is a schematic diagram showing a first type of ferroelectric memory cell. This memory cell consists of two p-channel transistors M1 and M3, four n-channel transistors M2, M4, M5, and M6, and two ferroelectric capacitors FC1 and FC2. Two transistor pairs (M1, M2) and (M3, M4) are each configured as inverters, and their outputs are cross-connected to each other's input, thus forming an SRAM memory cell. The source terminals of transistors M1 and M3 are connected to the supply voltage line PWR, while those of transistors M2, M4 are connected to the ground line VSS.

The output nodes of the two inverters (M1, M2) and (M3, M4) are referred to as "storage nodes" and labeled S1 and S2, respectively. Transistors M5 and M6, coupled to those storage nodes S1 and S2, serve as access transistors which transport data signals to/from complementary bit lines BL and XBL in reading and writing a memory cell. The gate terminals of those access transistors M5 and M6 are controlled by one of eight word lines WL(x), where x is an integer from 0 to 7. The transistor M6 may be omitted in the case where differential access is not required.

Ferroelectric capacitors FC1 and FC2 are connected between a plate line PL and each storage node S1 and S2, respectively. The plate line PL is used in controlling a write cycle of a memory cell. It is also controlled to prevent ferroelectric fatigue due to a high voltage applied when the cell is in storage state. Ferroelectric capacitors FC1 and FC2 are made of, for example, a ferroelectric material primarily consisting of lead zirconate titanate (PZT), or other ferroelectric materials with a bismuth-layered perovskite structure, including strontium bismuth tantalate (SBT).

Figure 7:
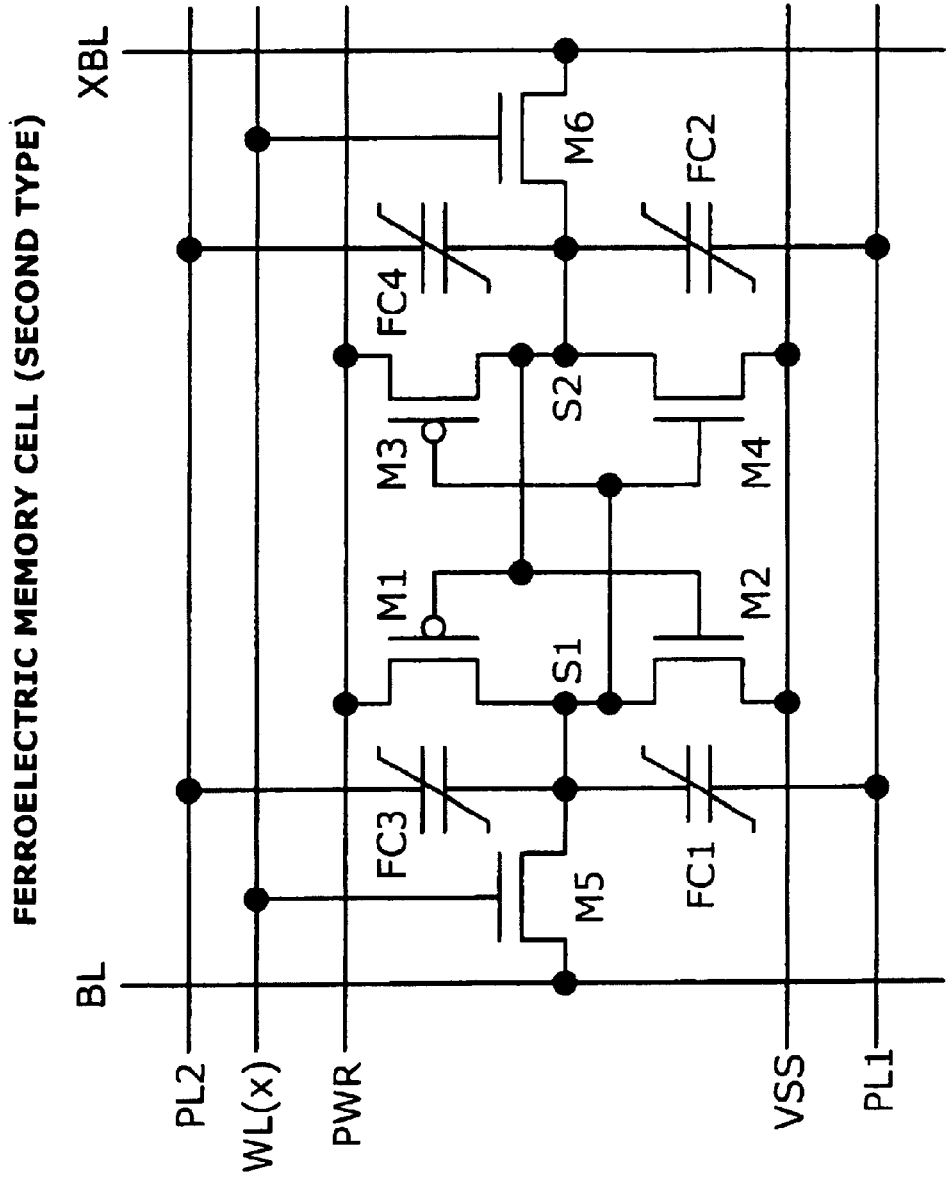
FIG. 7 is a schematic diagram showing a second type of ferroelectric memory cell.

FIG. 7 is a schematic diagram showing a second type of ferroelectric memory cell. Because of its resemblance to the first type (FIG. 6), like reference numerals are used to refer to like elements in FIG. 7. The second type of ferroelectric memory cell, however, differs from the first type in its additional ferroelectric capacitors FC3 and FC4 connected to the storage nodes S1 and S2, respectively. The other ends of FC3 and FC4 are connected to a second plate line PL2 provided separately from PL1. Thanks to the additional ferroelectric capacitors FC3 and FC4, the second-type ferroelectric memory cells exhibit better data-recalling characteristics than the first type. That is, the stored data can be read out of memory cells more reliably when the device is powered up again.

FIG. 8 shows, in table form, the state of control signals in each operation mode of a ferroelectric memory. This table applies to both the first and second types of ferroelectric memory cells described above. The signals are controlled in the same way as in normal SRAM cells, except that the plate line PL (or PL1, PL2 in FIG. 7) are involved.

A write operation is invoked by a high-level signal on the write enable line WE to the memory controller 22. The memory controller 22 first drives a specific word line WL(x) to high and then applies a high-to-low pulse to the plate line(s) PL. The step of plate line control is peculiar to the ferroelectric memory cycles. The ferroelectric capacitors are polarized according to the state of bit lines BL and XBL. The memory controller 22 writes data to the eight configuration memory words 23-0 to 23-7 shown in FIG. 3, activating different word lines WL(x) one by one.

A read operation, indicated by a low-level signal on the write enable line WE, proceeds in the same way as in ordinary SRAM read cycles. The memory controller 22 drives a specific word line WL(x) to a high level, while applying half the supply voltage Vdd/2 to the plate line PL. This plate potential of Vdd/2 avoids unwanted variations in some property of ferroelectric memory, known as the imprint effect.

Once the device starts functioning as a logic circuit, the configuration memories go into a data retaining mode. The write enable line WE and word lines WL(x) are all low in this mode, while the plate line PL is kept at Vdd/2 for imprint prevention purposes.

As described above, the memory controller 22 uses half the supply voltage Vdd/2 to drive the plate line PL to prevent imprint effects from happening when the memories are in the read mode or retain mode. Although not illustrated, the programmable logic device contains a voltage generator circuit for Vdd/2, similar to those used in conventional DRAMs. Alternatively, the device may be designed to receive Vdd/2 from an external voltage source.

Programmable Interconnections and I/O Blocks

Figure 9:
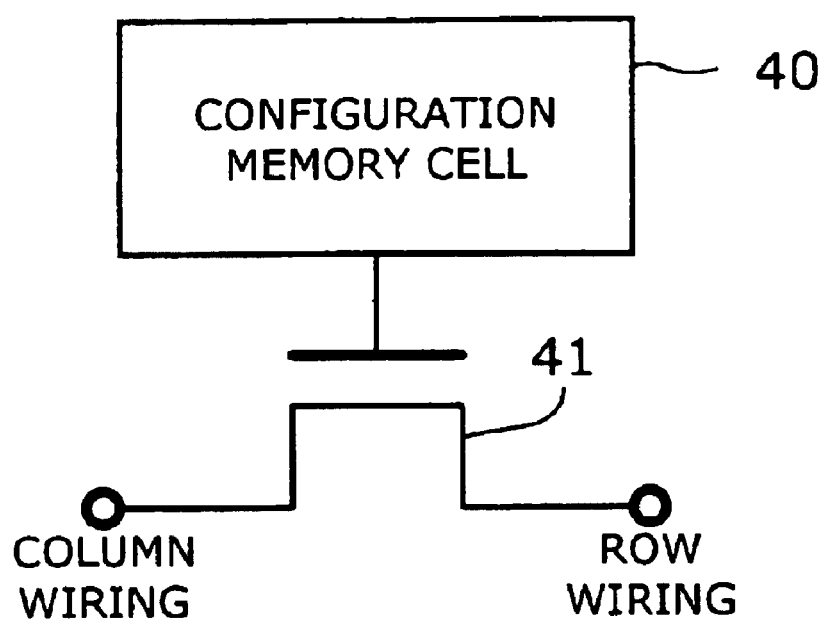
FIG. 9 shows a fundamental element of programmable interconnections.

FIG. 9 shows a fundamental element of the programmable interconnections 12. This element is composed of a ferroelectric configuration memory cell 40 and a pass transistor 41. The output of the memory cell 40 (more precisely, the output of its corresponding output buffer) is connected to the gate of the pass transistor 41. The programmable interconnections 12 are a chunk of such elements, and their memory cells are arranged in the same structure as those for the logic blocks 21 described earlier in FIG. 5. The programmable interconnections 12 provide connections between a plurality of wiring lines crossing each other, with a pass transistor 41 located at every intersection of those lines. Each pass transistor 41 activates or deactivates its conduction channel between drain and source according to the output of its corresponding configuration memory cell 40, thereby controlling circuit connections.

The programmable interconnections 12, however, are not limited to the configuration explained above. As an alternative, the programmable interconnection 12 may use a multiplexer-based crossbar design proposed by A. DeHon in "Dynamically Programmable Gate Arrays: A Step Toward Increased Computational Density" (Fourth Canadian Workshop of Field-Programmable Devices, 1996. This approach enables us to reduce the amount of configuration memories.

Figure 10:
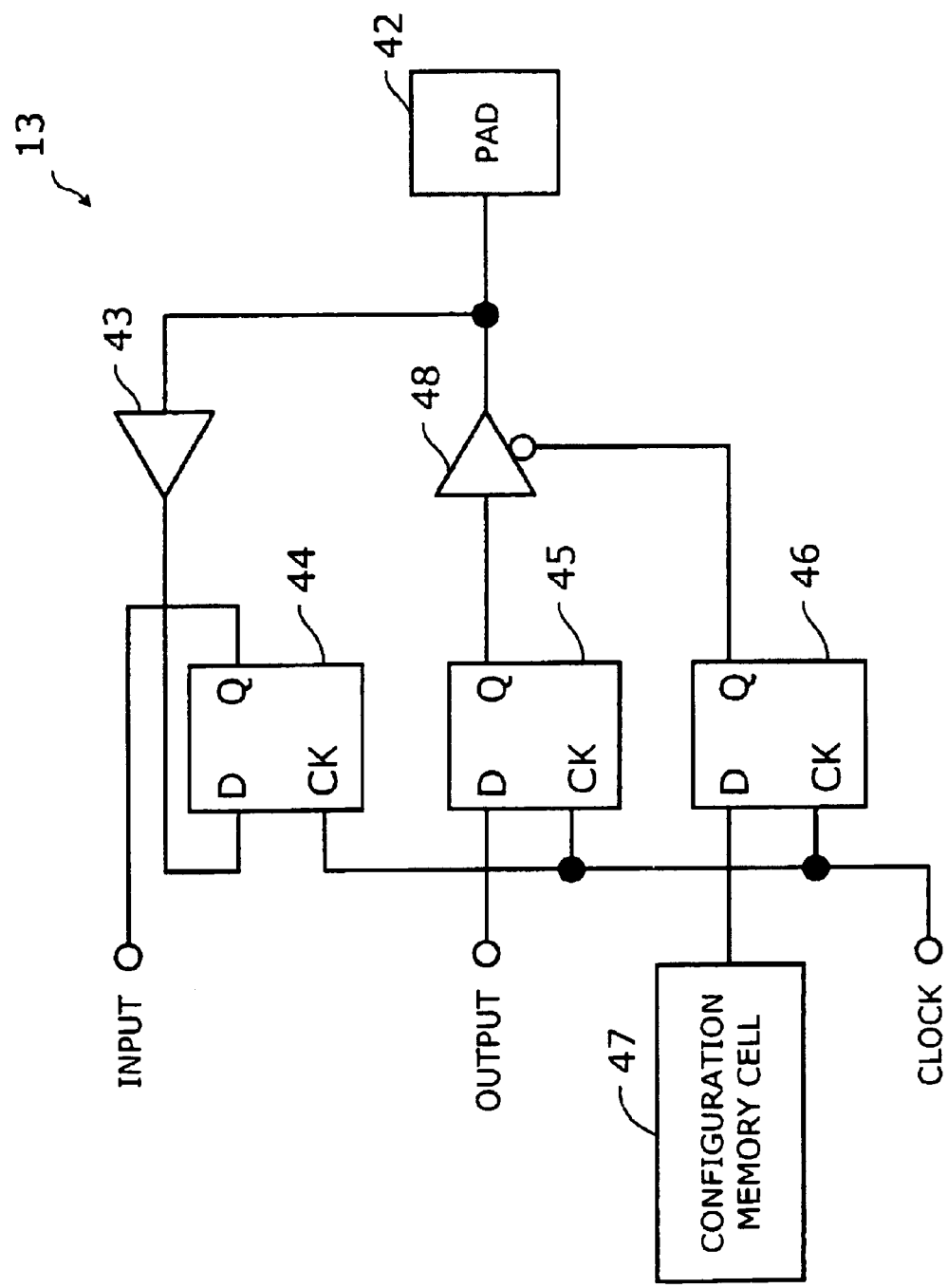
FIG. 10 shows a fundamental element of programmable I/O blocks.

FIG. 10 shows an example of the programmable I/O block. This programmable I/O block 13 is configured as follows. An input buffer 43 is connected to a pad 42 to receive an input signal, and a first flip-flop 44 captures this signal. A second flip-flop 45 latches the output signal of a logic block and sends it to the pad 42 through a noninverting tristate buffer 48. The output enable (active low) of the tristate buffer 48 is connected to a third flip-flop 46, which catches the output of a ferroelectric configuration memory cell 47. The configuration memory cell 47 has the same structure as that for the logic blocks 21 described earlier in FIG. 5. All the three flip-flops 44 to 46 operate in synchronization with a clock signal.

More specifically, the above programmable I/O block 13 operates as follows. The third flip-flop 46 feeds the output of the configuration memory cell 47 to the active-low output enable terminal of the tristate buffer 48 in synchronization with the clock signal. If this output enable signal is high, the output of the tristate buffer 48 goes to a high-impedance state, meaning that the programmable I/O block 13 is now configured as a data input port. Accordingly, the input signal on the pad 42 is supplied to the first flip-flop 44 via the input buffer 43, and the first flip-flop 44 catches it in synchronization with the clock signal as an input to the programmable logic device 10.

If, on the other hand, the output enable signal is low, the tristate buffer 48 becomes active, meaning that the programmable I/O block 13 is configured as a data output port. Thus the present output signal of the programmable logic device 10 appears at the pad 42, being latched in the second flip-flop 45 in synchronization with the clock signal. The illustrated programmable I/O block 13 can be designated as an input port or output port in this way, depending on the data stored in the corresponding configuration memory cell 47.

Configuration Switching

Figure 11:
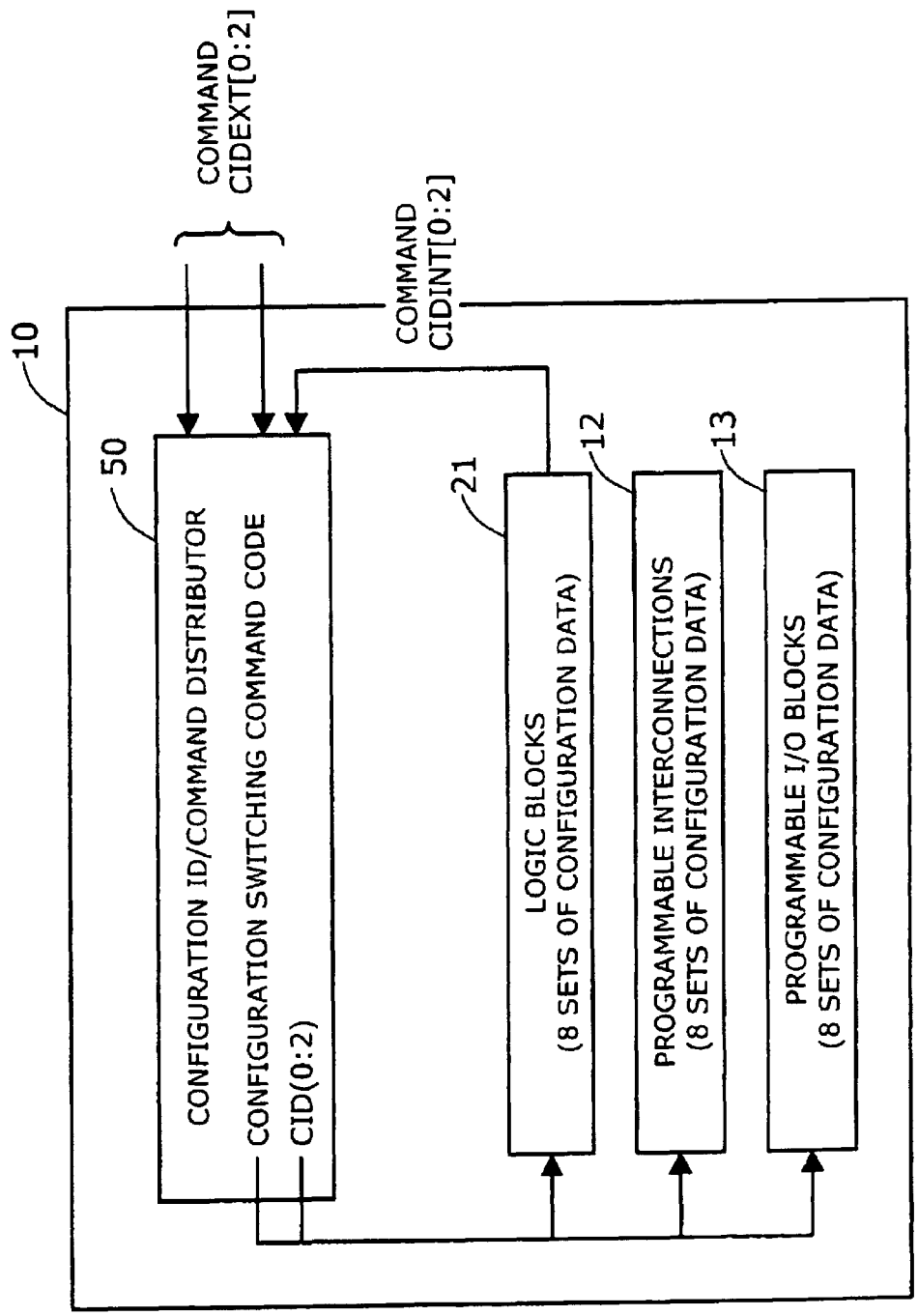
FIG. 11 shows how the configuration data is switched from one set to another.

The proposed programmable logic device 10 is designed to store and use multiple sets of configuration data, switching from one to another. Referring to FIG. 11, we will see how to switch the configuration.

The programmable logic device 10 has a configuration identifier(ID)/command distributor 50 to handle configuration switching commands from both outside and inside the device 10. That is, it receives external commands CIDEXT from some sources and supplies them to their destinations, including logic blocks 21, programmable interconnections 12, and programmable I/O blocks 13, each containing ferroelectric configuration memories. In addition, the configuration ID/command distributor 50 receives internal commands CIDINT from the logic blocks 21 and delivers them to their destinations in the same way. Internal commands CIDINT are produced by a sequencer that is built in the logic blocks 21, and they are supplied to the configuration ID/command distributor 50, sometimes through a programmable interconnection 12.

In the present example, 8-way -configuration memories are employed in the logic blocks 21, programmable interconnections 12, and programmable I/O blocks 13. To specify which configuration data set to use, a three-bit configuration identifier CID(0:2) is assigned to each set. The above-described commands CIDEXT and CIDINT therefore have a configuration ID field, in addition to a configuration switching command code. Upon receipt of a command CIDEXT or CIDINT, the configuration ID/command distributor 50 sends the value of CID(0:2) and command code to relevant memory controllers in the building blocks 21, 12, and 13. Every receiving memory controller selects one of eight memory words specified by CID(0:2), thereby switching the configuration data defining functions in the logic blocks 21, programmable interconnections 12, and programmable I/O blocks 13.

Specific Example of Logic Block Structure

Figure 12:
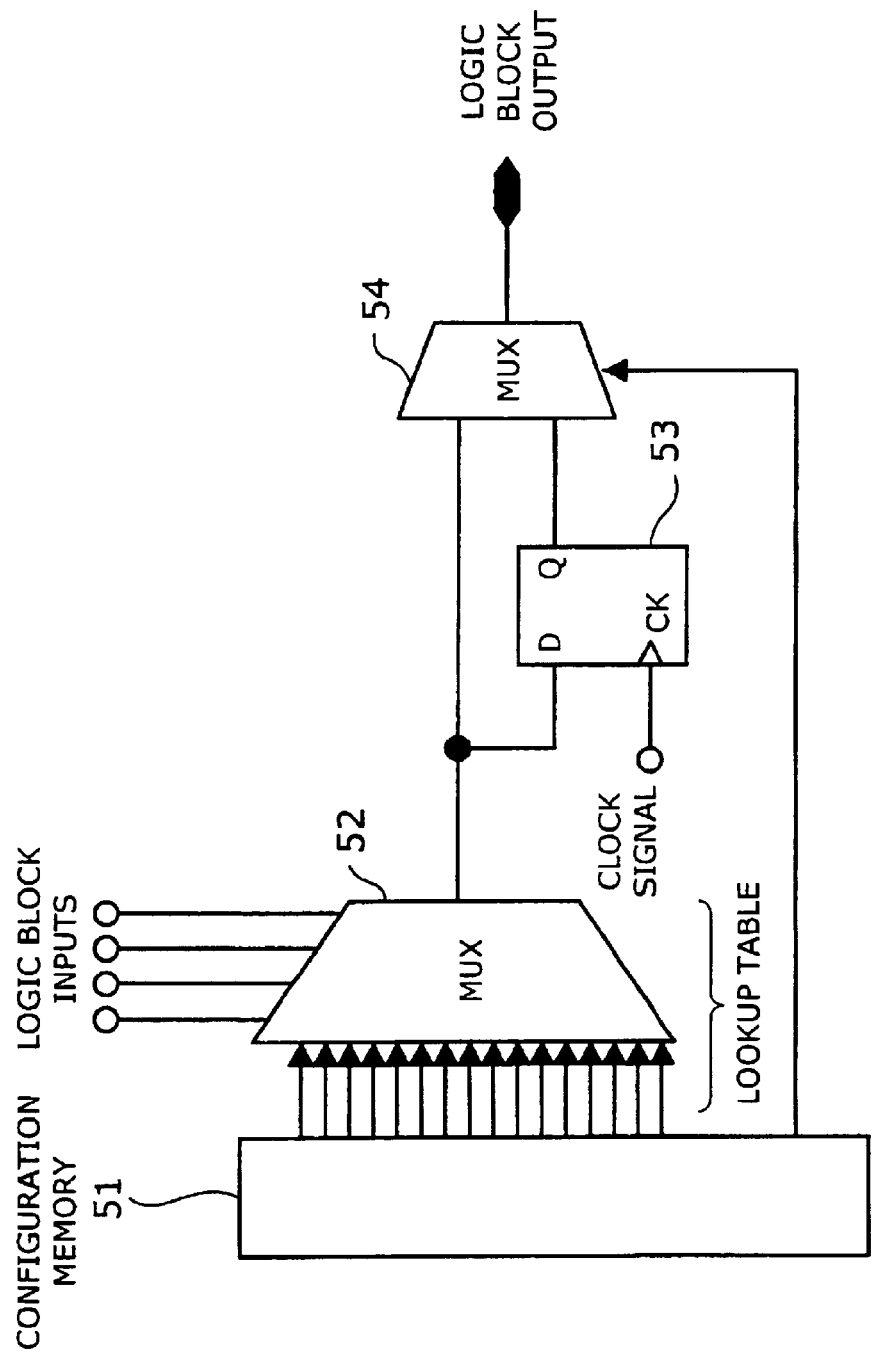
FIG. 12 is a schematic diagram showing the structure of a conventional logic block.
Figure 13:
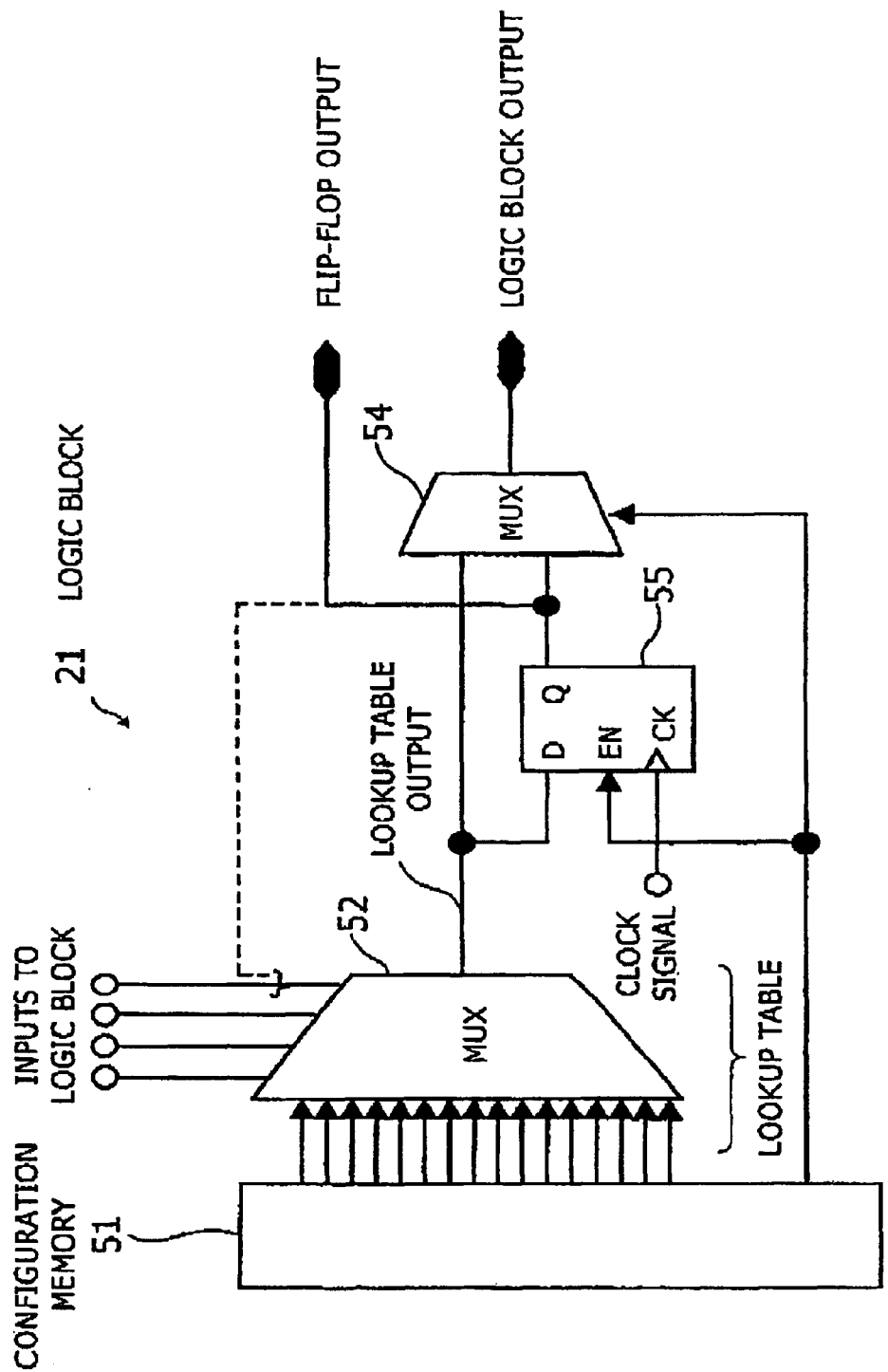
FIG. 13 is a schematic diagram showing the structure of a logic block used in a programmable logic device of the present invention.

FIG. 12 is a schematic diagram of a conventional logic block, and in contrast to this, FIG. 13 shows a logic block 21 according to the present invention. The conventional logic block model of FIG. 12 comprises the following components: a configuration memory 51 holding a single-word configuration data, a multiplexer 52 to select one bit of the configuration data word as specified by a given set of logic block inputs, a D-type flip-flop 53, and a 2:1 multiplexer 54 to select either the multiplexer 52's output or flip-flop 53's. Here, the configuration memory 51 is combined with the multiplexer 52 to function as a look-up table that implements a desired combinational logic. This structure of logic blocks is commonly seen in conventional FPGA designs.

The present invention, on the other hand, uses logic blocks shown in FIG. 13. The illustrated logic block 21 comprises the following components: a configuration memory 51 with multiple configuration data sets, a multiplexer 52 to choose one bit out of the currently selected configuration data according to given logic block inputs, a D-type flip-flop 55 with an enable input EN, and a 2:1 output multiplexer 54 to choose either the multiplexer 52's output or flip-flop 55's. Here, the configuration memory 51 is combined with the multiplexer 52 to function as a look-up table that implements a desired combinational logic. The selection control input of the output multiplexer 54 is connected to a configuration data bit, and the same bit is also used to control the enable input EN of the flip-flop 55. The flip-flop 55 is timed by a clock signal only when its EN input is set to high; otherwise, the flip-flop 55 holds its previous state. Further, the embodiment of FIG. 13 provides a direct flip-flop output, in addition to its primary output (logic block output), for use in other logic blocks.

With its enable input EN, the flip-flop 55 can act as a memory that stores a previous logic state before configuration data is changed, besides providing functions as an ordinary flip-flop. More specifically, suppose that the present configuration data is defined to make the output multiplexer 54 select the output of the flip-flop 55. This means that a high-level signal is applied to the selection control input of the output multiplexer 54, which accordingly activates the enable input EN of the flip-flop 55. The flip-flop 55 is now enabled and thus catches its current data input state at an active edge of the clock signal. The output of the flip-flop 55 appears at the logic block output terminal, straight through the output multiplexer 54. As seen, the proposed logic block 21 behaves in the same way as the conventional logic block shown in FIG. 12.

Suppose now that the configuration data is changed to another set to make the output multiplexer 54 select the lookup table output. The selection control input of the output multiplexer 54 changes to low, which accordingly negates the enable input EN of the flip-flop 55. Since the flip-flop 55 is deactivated, its output state stays as is, meaning that the previous logic output state is memorized in the flip-flop 55. This feature enables the newly configured programmable logic blocks to use the result of its preceding logic operations performed before the configuration data is switched.

If necessary, the logic block 21 of FIG. 13 may be modified in such a way that the output of the flip-flop 55 be fed back to the lookup table (i.e., it is wired to one of the four logic block inputs given to the multiplexer 52). With this setup, the logic block 21 can perform a combinational logic operation using the result of its previous configuration, without the need for a dedicated memory for that purpose.

Handling of Undefined Configuration Data

Figure 14:
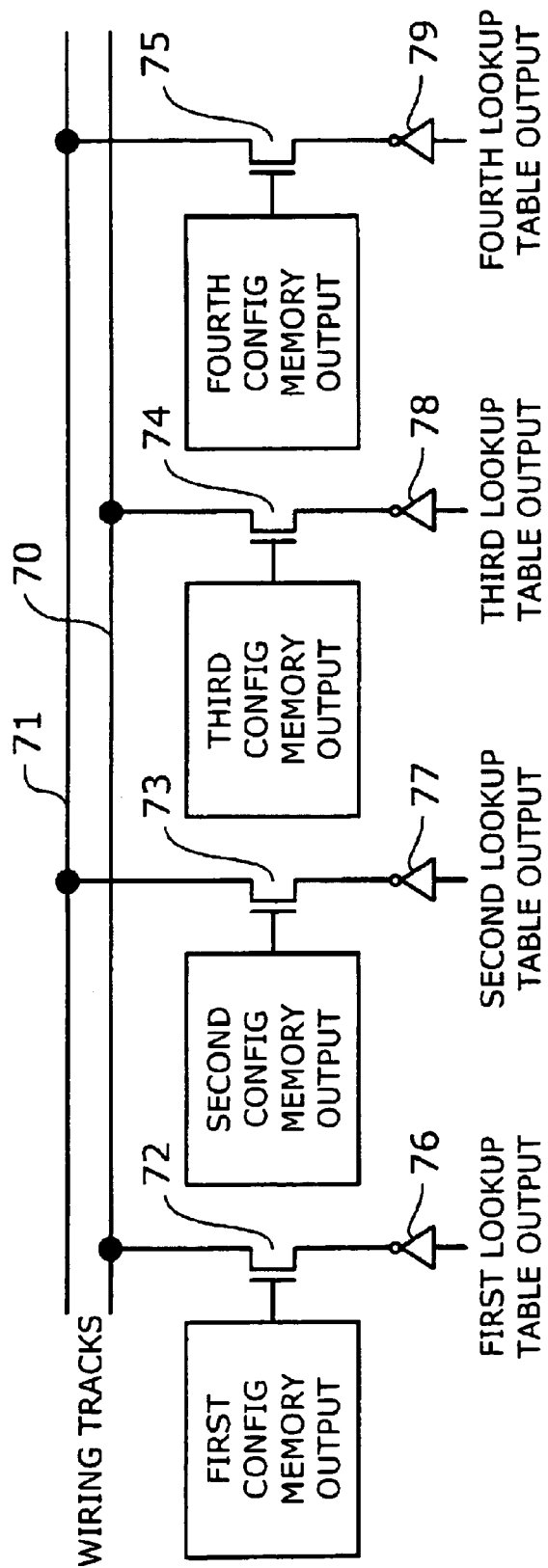
FIG. 14 shows conventional programmable interconnections with ferroelectric configuration memories.

FIG. 14 shows an example of conventional programmable interconnections with a ferroelectric configuration memory. Programmable logic devices generally employ such programmable interconnections, which include a plurality of wiring tracks 70 and 71 with pass transistors 72 to 75 to feed the outputs of lookup tables. More specifically, two pass transistors 72 and 74 are connected to the lower wiring track 70, and another two pass transistors 73 and 75 are connected to the upper wiring track 71. According to the first to fourth configuration memory outputs, the pass transistors 72 to 75 determine whether to pass or block each of the first to fourth lookup table outputs, which are supplied through output buffers 76 to 79.

The configuration memory outputs are, however, simply indefinite until the corresponding ferroelectric memory cells are loaded with valid configuration data. For this reason, the first and third configuration memory outputs, for example, could make the pass transistors 72 and 74 turn on at the same time, causing the corresponding lookup table outputs to be tied together on the lower wiring track 70. Since lookup tables are also in an indefinite state until valid configuration data is defined, there is a chance that the first and third lookup table outputs happen to be, for instance, high and low, respectively. These conflicting signal levels would cause a large current over the wiring track 70, while bringing its potential to an unstable middle voltage.

To solve the above problem, conventional SRAM-based programmable logic devices are designed to disable the outputs of their lookup tables each time the device powers up, since its configuration memory is empty. In the case of ferroelectric memory-based programmable logic devices, however, it is not necessary to disable their lookup table outputs every time the device powers up. This is because their lookup table outputs become stable, once the configuration data is written.

Figure 15:
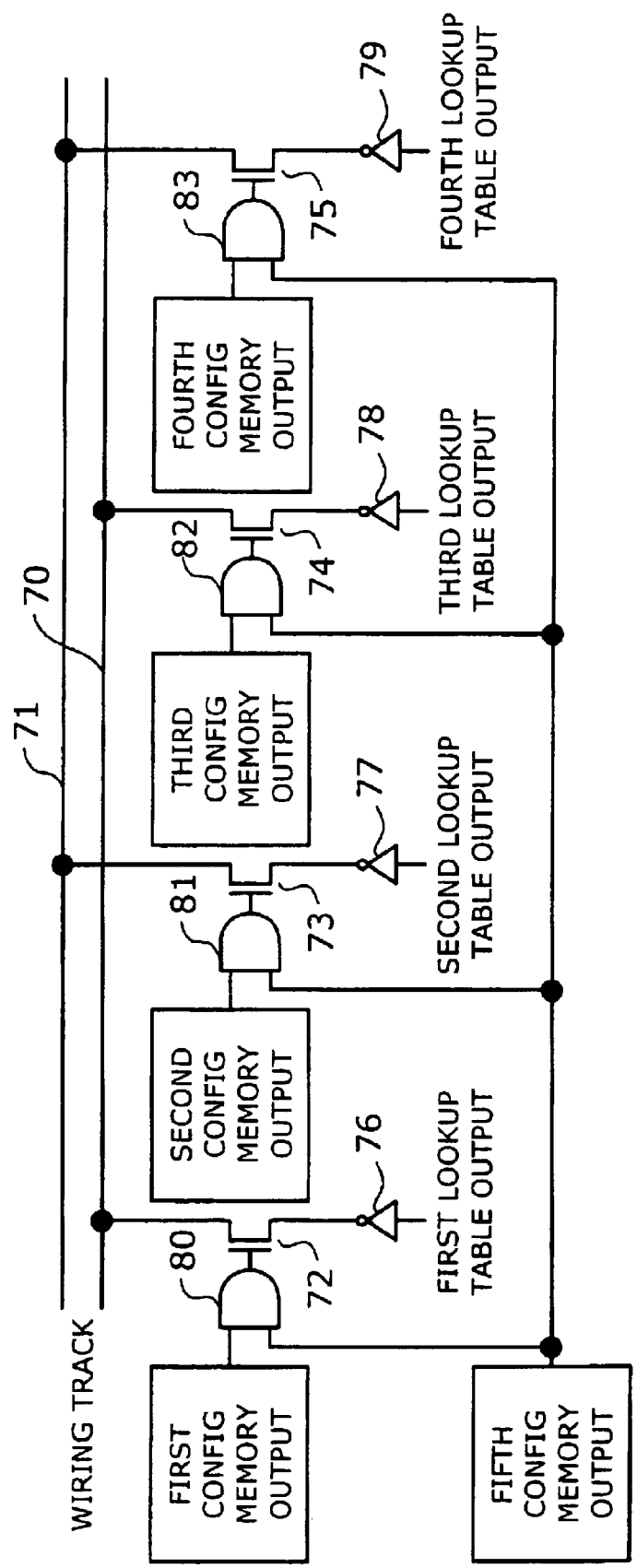
FIG. 15 shows an example of programmable interconnections according to the present invention.

FIG. 15 shows an example of programmable interconnections according to the present invention, which has a mechanism to avoid conflict of signals. In the illustrated programmable interconnection, an AND gate 80 to 83 is placed at the gate of each pass transistor 72 to 75. Those AND gates 80 to 83 are supplied with the first to fourth configuration memory outputs on one input and the fifth configuration memory output on the other input. Here, the fifth configuration memory is, for example, a ferroelectric SRAM cell provided to store the information as to whether valid configuration data has already been written.

When powered up, the proposed programmable logic device determines whether to trust the first to fourth configuration memory outputs in controlling the pass transistors 72 to 75, consulting the information stored in the fifth configuration memory. If the fifth configuration memory indicates the absence of valid configuration data, all AND gates 80 to 83 disable their corresponding configuration memory outputs. If it indicates in turn the readiness of configuration data, the AND gates 80 to 83 allow the first to fourth configuration memory outputs to define the usage of wiring tracks 70 and 71. In this way, the risk of bus conflict is avoided.

We mentioned the use of ferroelectric SRAM cells for the fifth configuration memory. The present invention, however, should not be limited to that specific type of memory. The fifth configuration memory may also be composed of ferroelectric memory cells with the commonly used two-transistor two-capacitor (2T2C) structure or one-transistor one-capacitor (1T1C) structure.

The conflict avoidance mechanism described above can also be employed in programmable I/O blocks in a similar way. While we do not present the specifics, the fifth configuration memory (or its equivalent) disables I/O ports until their configuration data is ready.

The above-described problem of undefined configuration data is related not only to the programmable interconnections, but also to, for example, the configuration switching mechanisms discussed earlier in FIG. 11. With the absence of valid configuration data, the device could continuously generate configuration switching commands CIDINT since its internal logic blocks are undefined. For this reason, the configuration ID/command distributor 50 has to have some additional protection circuit, so that it will neglect internal configuration switching commands until the configuration memories are loaded with valid data.

Because the proposed programmable logic device is designed to store multiple configuration data sets, the aforementioned ferroelectric memory indicating the readiness of each configuration memory should provide as many bits as the number of configuration data sets. Specifically, the device has one such bit for each different configuration ID (CID), and those "not-ready" bits are initialized by the manufacturer of programmable logic devices before shipment to customers. To this end, the device has a test input to inhibit logic blocks and programmable interconnections from being erroneously activated or causing unwanted signal conflict. The manufacturer activates this test input when initializing the not-ready bits described above.

Using Configuration Memory as ROM

In general logic circuit designs, read-only memory (ROM) is employed as storage of constant values and the like. Because of its relatively small cell size, the provision of ROM blocks saves the space for integrating more logic gates in a limited chip area. The present invention enables logic designers to use a configuration memory as read-only memory, rather than implementing dedicated ROM cells or realizing the equivalent function with logic cells. The read-only memories 14 (FIG. 2) in the proposed programmable logic device 10 are this kind of configuration memory-based ROMs.

Figure 16:
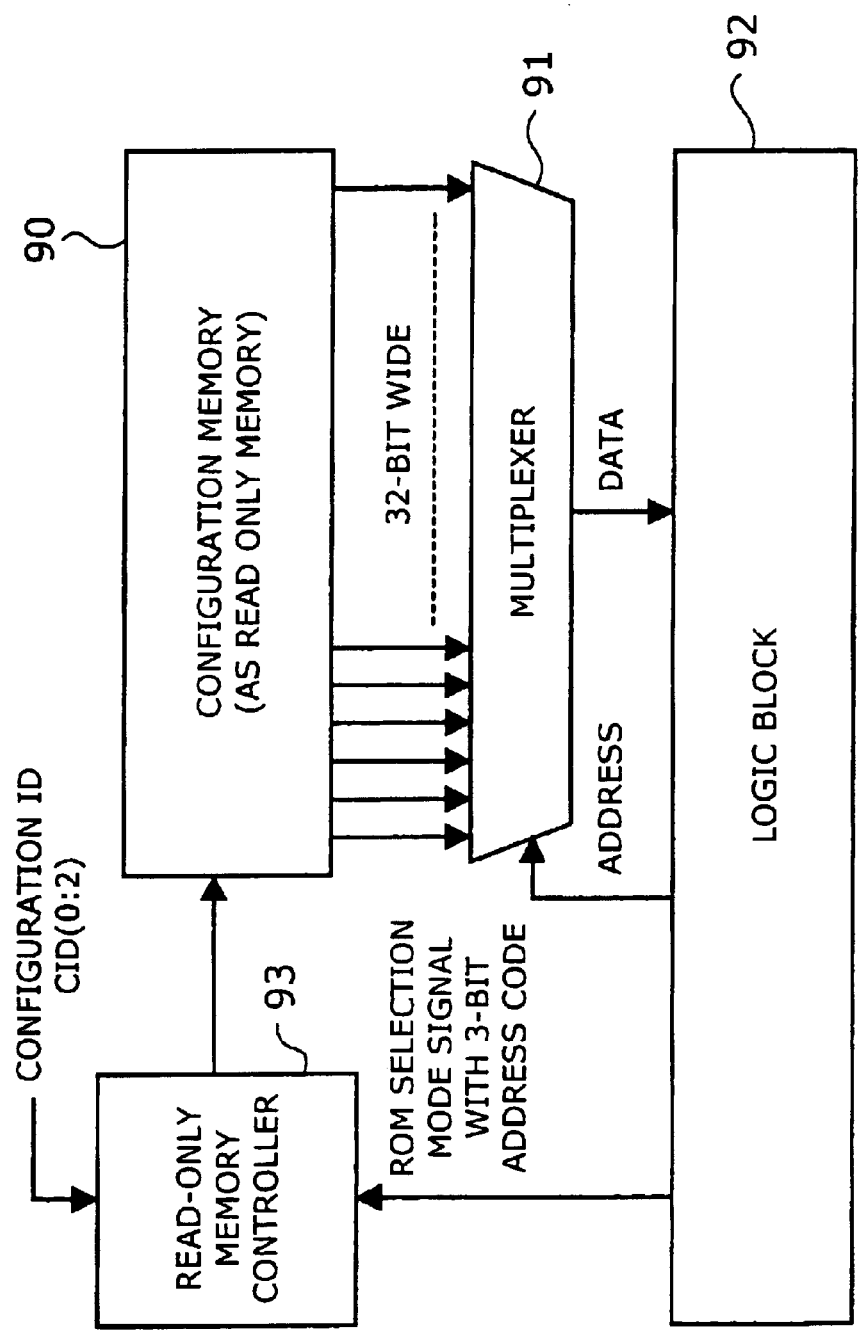
FIG. 16 shows an example of a read-only memory realized with a configuration memory.

FIG. 16 shows an example of a read-only memory function realized with a configuration memory. The output of a configuration memory 90 is connected to a multiplexer 91 which is coupled to a logic block 92 with address and data lines. The configuration memory 90 is controlled by a read-only memory controller 93. This controller 93 receives a three-bit configuration identifier CID(0:2) from a configuration ID/command distributor 50 (FIG. 11) that specifies a particular set of configuration data. It also receives a ROM selection mode signal with three-bit address signals from the logic block 92. The configuration memory 90 stores eight data words with a width of 32 bits, for example.

The ROM selection mode signal from the logic block 92 determines how the read-only memory controller 93 selects a configuration data word for use as a ROM data word, hence the "ROM selection mode." Suppose here that this signal is currently set to low. The logic block 92 is operating with a particular set of configuration data associated with the current CID, and the read-only memory controller 93 causes the configuration memory 90 to output a data word having that same CID. The multiplexer 91 then extracts a part of this 32-bit data word for use in the logic block 92, according to the state of address lines supplied from the logic block 92. Note again that the source data for the multiplexer 91 in this ROM selection mode is a particular data word in the configuration memory 90 that is identified by the current configuration ID.

On the other hand, when the ROM selection mode signal is turned to high, a three-bit address code from the logic block 92 governs the read-only memory controller 93. That is, those address signals are intended for the read-only memory controller 93 to select one of eight data words stored in the configuration memory 90. In this ROM selection mode, the read-only memory controller 93 gives the three-bit code to the configuration memory 90, as opposed to the current CID in the other mode, so that the logic block 92 can specify a desired data word. The selected 32-bit data word is then supplied to the multiplexer 91. According to the address lines from the logic block 92, the multiplexer 91 extracts a particular part of the word for use in the logic block 92.

The system of FIG. 16 offers two ROM access methods in the way described above. When the ROM selection mode signal is low, the logic block 92 can read a configuration data word that belongs to the currently used configuration data set. When the ROM selection mode signal is high, the logic block 92 is allowed to read any word in the configuration memory 90 by specifying it with a three-bit code. Note that the arrangement shown in FIG. 16 is only an illustration; the number of configuration data words, the width of a data word, the number of code bits, and other parameters will vary from implementation to implementation.

Reading and Writing Configuration Data

Figure 17:
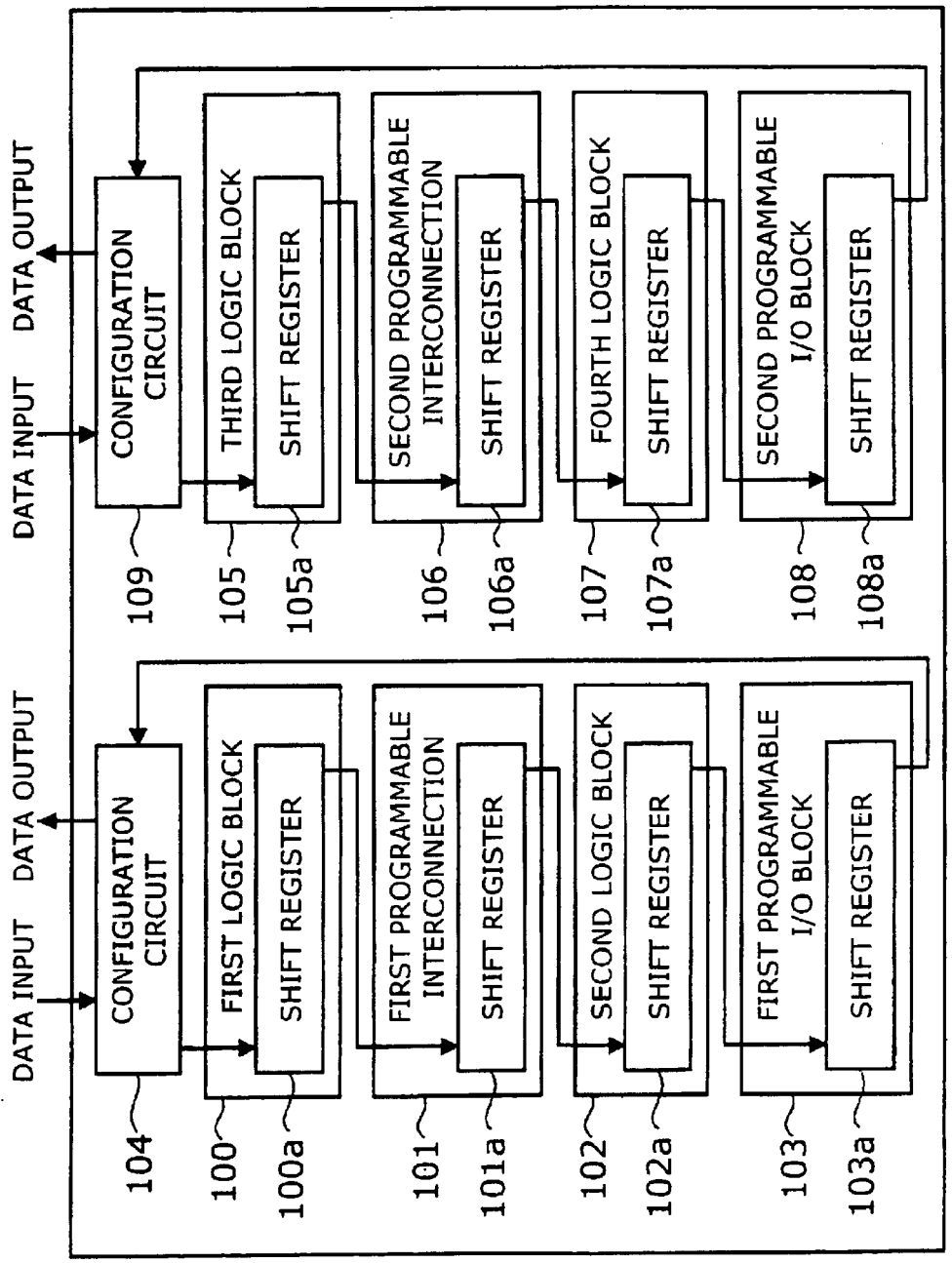
FIG. 17 shows how the configuration data is downloaded from an external source to integral configuration memories.

FIG. 17 shows how the configuration data is downloaded from an external source to integral configuration memories. A programmable logic device contains a plurality of programmable logic blocks, programmable interconnections, and programmable I/O blocks, each having a configuration memory to store configuration data therefor, as discussed earlier in FIG. 1. According to the present invention, those building blocks in a device are divided into a plurality of groups for the purpose of convenience in writing and reading their configuration data.

More specifically, FIG. 17 illustrates two such groups, one on the left, and the other on the right. The first group consists of a first logical block 100, a first programmable interconnection 101, a second logical block 102, and a first programmable I/O block 103. A configuration circuit 104 is employed to take care of this first group of building blocks. Likewise, the second group consists of a third logical block 105, a second programmable interconnection 106, a fourth logical block 107, and a second programmable I/O block 108. A second configuration circuit 109 is dedicated to the second group of building blocks.

The building blocks 100 to 103 in the first group have integral shift registers 100a to 103a in order to transfer configuration data to/from their respective integral configuration memories. Those shift registers are what we explained as the shift register 30 in FIG. 5. The configuration circuit 104 and shift registers 100a to 103a are linked in series in that order. The end of the last shift register 103a is fed back to the configuration circuit 104, which is used as a read-out path.

Similar to the first group, the second-group building blocks 105 to 108 have their own shift registers 105a to 108a, respectively, to transfer configuration data to/from their respective integral configuration memories. The second group's configuration circuit 109 and shift registers 105a to 108a are cascaded in that order. The end of the last shift register 108a is fed back to the configuration circuit 109, which is used as a read-out path.

While FIG. 17 illustrates only two groups, configuration memories in a device may be divided into more groups. Our intention is to make it possible for all groups to read or write configuration data in a concurrent fashion. This grouped memory structure of the present invention enables fast loading and reading of configuration data to/from a programmable logic device.

The configuration circuits 104 and 109 parse a given command to read or write configuration data. In the write operation, configuration data streams are supplied from an external source to each configuration circuit 104 and 109 through some pre-assigned terminals of the device. The first-group configuration circuit 104 supplies the received configuration data stream to the shift registers 100a to 103a in its own group. The write circuit (i.e., memory controller) in each receiving block then transfers the data from its local shift register 100a to 103a to ferroelectric memory cell arrays in that block. Likewise, the second-group configuration circuit 109 supplies the received configuration data stream to the shift registers 105a to 108a in its own group. In this way, all configuration memories in the device are filled out with configuration data.

Figure 18:
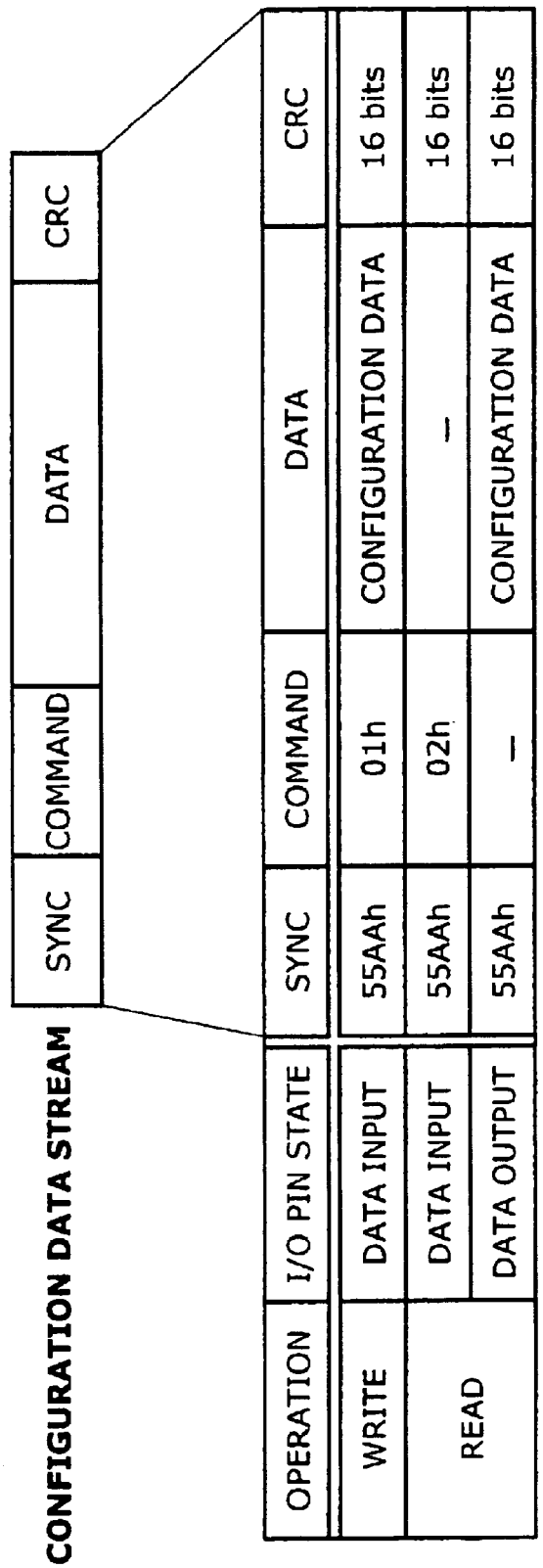
FIG. 18 shows an example of a configuration data stream supplied from an off-chip source.

FIG. 18 shows an example of a configuration data stream supplied from an off-chip source. As can be seen from FIG. 18, an incoming configuration data stream consists of the following fields: synchronization sequence, command, write data, and cyclic redundancy check code (CRC). The configuration circuits 104 and 109 extract necessary configuration data out of those fields and send them to the shift registers 100a to 108a. CRC is an error checking code, and the configuration circuits 104 and 109 request the off-chip data source to resend the data stream if a CRC error is found.

The shift registers 100a to 108a, however, do not immediately pass the data to their corresponding configuration memories even if they are ready to do so. One reason for this is that the device must stand prepared to deal with transmission errors in the received data. Another reason is that the device will be able to provide more logic functions than its memory capacity (e.g., eight sets) allows, if it is possible for the device to change its logic configuration during the operation.

Figure 19:
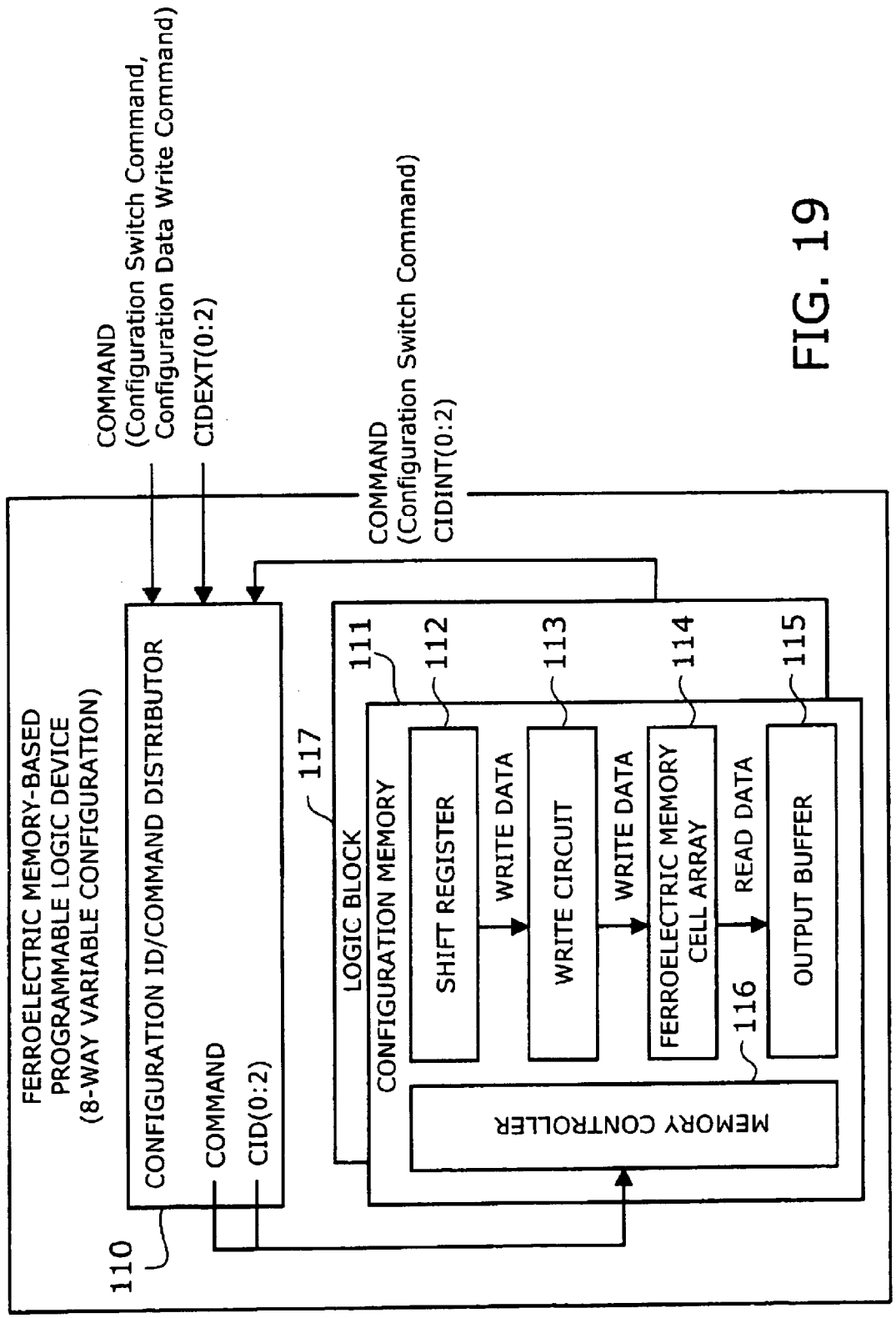
FIG. 19 shows a write operation of configuration data.

FIG. 19 shows how the configuration data is written into a configuration memory 111 in the aspect of command handling. This configuration memory 111 has a shift register 112 to receive a write data stream and outputs it to a ferroelectric memory cell array 114 via a write circuit 113. Even in the middle of the ongoing logic operation, a configuration ID/command distributor 110 accepts configuration switch commands and/or configuration data write commands from an off-chip source, as well as configuration switch commands from an on-chip logic block 117, both of which are accompanied by a configuration ID. Given a command in such a way, a memory controller 116 transfers configuration data from the shift register 112 to the specified portion of the ferroelectric memory cell array 114.

In a memory write cycle, the bit lines BL and XBL (see memory cell structure in FIGS. 6 and 7) are driven with write data. The write data, however, would not affect the ongoing logic operation since the output buffer 115 is disconnected from those bit lines BL and XBL at that moment. This means that new configuration data sets can be loaded into configuration memories in parallel with the execution of the present configuration. The above-described circuit structure enables a programmable logic device to change its own logic configuration in the background (i.e., in parallel with its ongoing operation), which results in a dramatic increase in the effective number of gates per unit chip area.

Security Considerations for Programmable Logic Devices

We will now move to the security issue with programmable logic devices. With poor data protection mechanisms, conventional FPGAs with volatile memories allow anybody in the know to make access to their configuration data for which a company has invested their resources in its development. This means that the precious configuration data is exposed to the risk of being reverse engineered by competitors, or being rewritten by some malicious hackers.

Figure 20:
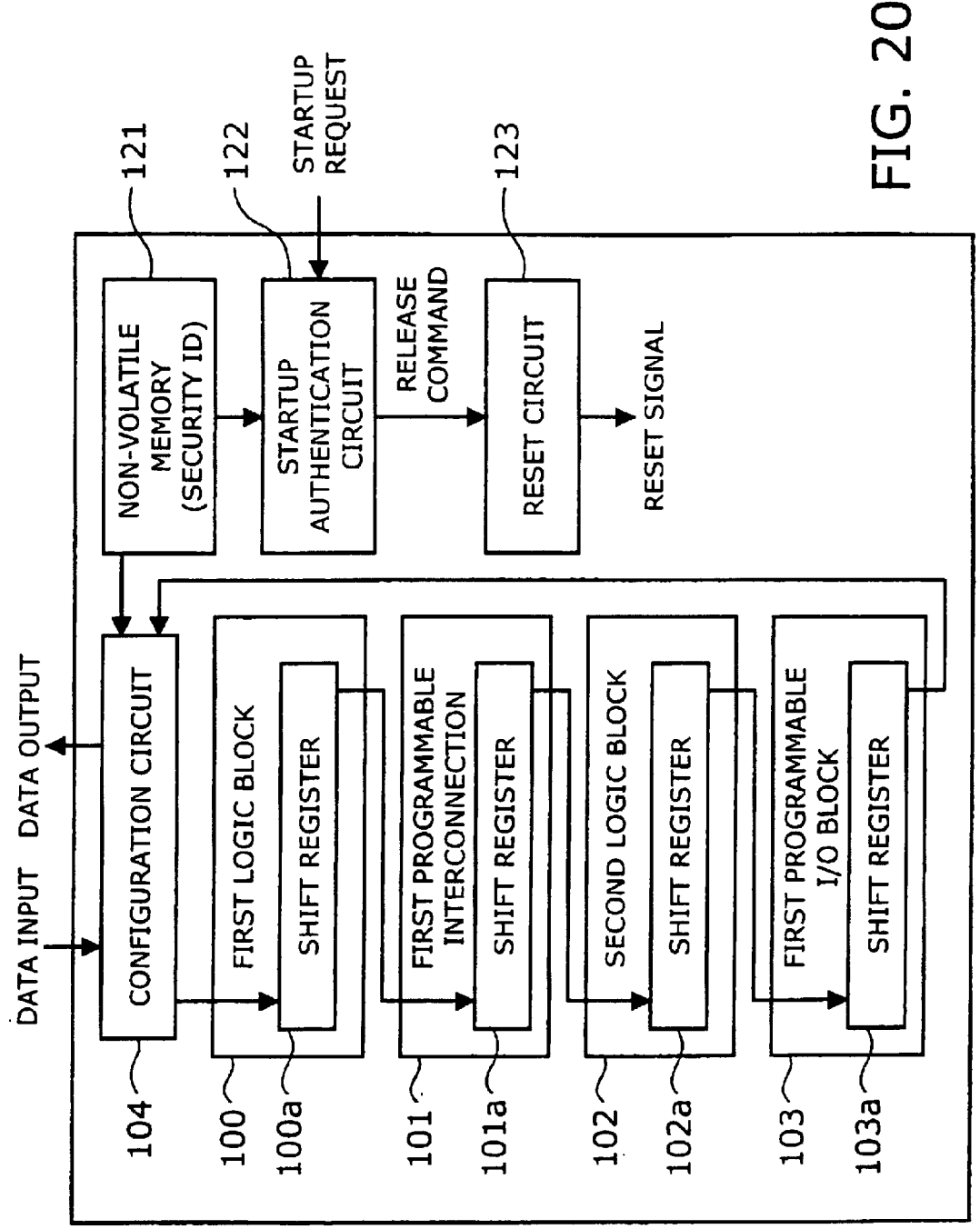
FIG. 20 shows an example of a security circuit.

To solve the above problem, according to the present invention, each device has a non-volatile ferroelectric memory to store a special code for protecting configuration data against any unauthorized access, including reverse engineering by competitors and rewriting by malicious outsiders. Security measures have to be associated with the circuits that control reading and writing of configuration data. FIG. 20 shows an example of a security circuit that is applied to a group of blocks on the left-hand side of FIG. 17. In this example, the term "security circuit" refers to a combination of a non-volatile memory 121, a startup authentication circuit 122, a reset circuit 123, and a part of the configuration circuit 104.

The non-volatile memory 121 stores a security ID that is uniquely associated with each device or each user. As one implementation of this non-volatile memory 121, a part of the configuration memory shown in FIG. 3 may be allocated to store a security ID. A programmable logic device with multiple-way variable configuration capabilities may have two or more security IDs. That is, a different security ID can be assigned for each configuration ID. In this case, it is preferable to use a device's configuration memories to store such configuration-specific security IDs.

The startup authentication circuit 122 compares the security ID in the non-volatile memory 121 with that in a given startup request. The reset circuit 123 keeps asserting a reset signal to control the device not to start operation until the startup authentication circuit 122 allows it.

Figure 21:
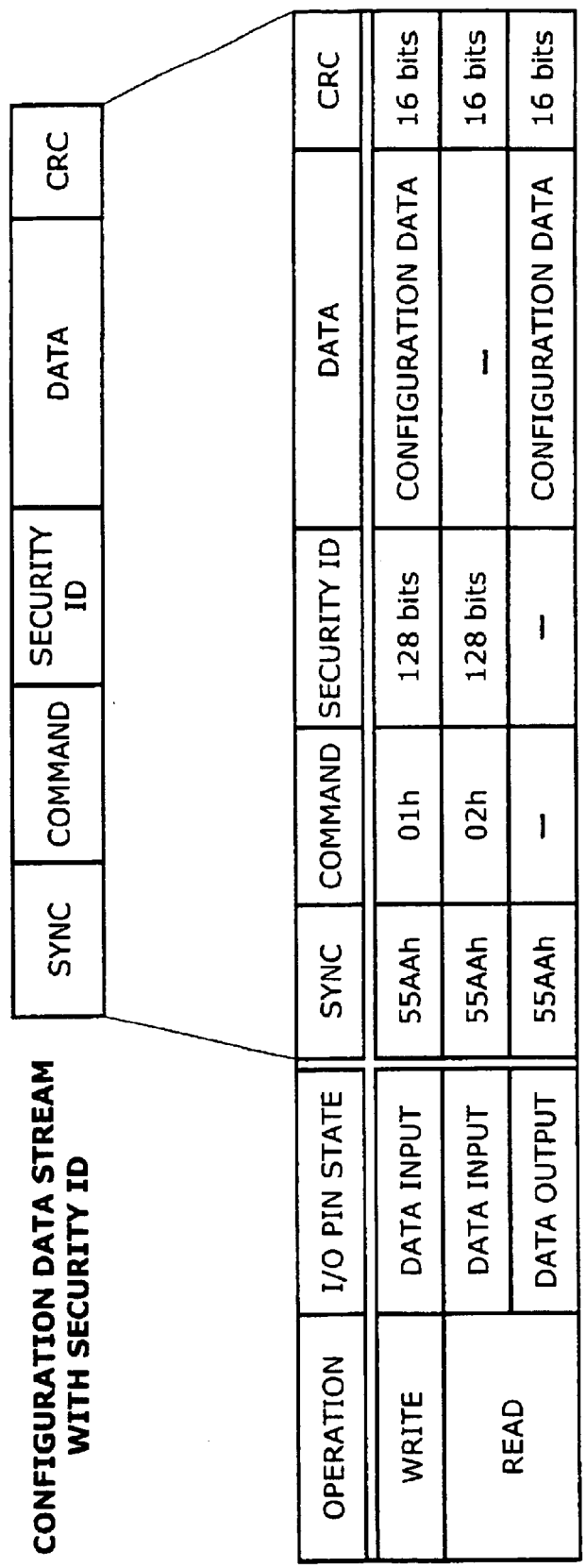
FIG. 21 shows an example of a configuration data stream for secure writing and reading of configuration data.

FIG. 21 shows an example of a configuration data stream for secure writing and reading of configuration data. This data stream contains a security ID with which the requesting party claims their authenticity. Upon receipt of such a configuration data stream, the configuration circuit 104 verifies whether the security ID in the received data stream agrees with that stored in the non-volatile memory 121. Disagreement between those two IDs would make the configuration circuit 104 reject the received write or read command. In this way, the security circuit prevents the stored configuration data from being read or written by a malicious third party.

As already mentioned, the startup authentication circuit 122 handles a startup request command sent from an off-chip source. It sends a release command to the reset circuit 123 only when the security ID in the received request message agrees with that in the non-volatile memory 121. This release command makes the reset circuit 123 negate the reset signal, thus permitting the programmable logic device to start operation. In the case the device has multiple configuration data sets, a different security ID can be assigned for each configuration ID. Such security IDs are stored in a device's configuration memory, and the device is allowed to operate only with the configurations whose use has been authenticated through comparison of their security IDs. In this way, the proposed security mechanism guards the device against unauthorized use.

Power Supply Control for Ferroelectric Memory

This section explains how the present invention protects configuration data in a ferroelectric memory from destruction upon power-up or power-down. As discussed earlier in the Related Art section, successful recalling of stored data in ferroelectric memory cells shown in FIG. 6 may not be guaranteed as long as its power supply system only offers a simple on/off control. Referring back to FIG. 6, there is a latch circuit constructed with four NMOS transistors M1 to M4. When the device is powered up, the voltages at storage nodes S1 and S2 are determined by which of the two n-channel transistors M2 and M4 turns on earlier than the other. At that time, however, the voltage across the ferroelectric capacitor FC1 or FC2 is 0.5 volts at most, and the two capacitors FC1 and FC2 show little relative difference in their charges. It is therefore possible for the latch in a memory cell to fail to restore its original state (i.e., data is lost).

The plate lines (PL in FIG. 6, PL1 and PL2 in FIG. 7) of ferroelectric memory cells are driven at Vdd/2 during normal operation, as described earlier in FIG. 8. To ensure the data retention in a long period, it is desirable for the ferroelectric capacitors FC1 and FC2 to be fully charged with the nominal supply voltage before the power is removed, so that the data be stored firmly. The following will explain how the proposed programmable logic device automatically performs such data recalling and storing operations.

Figure 22:
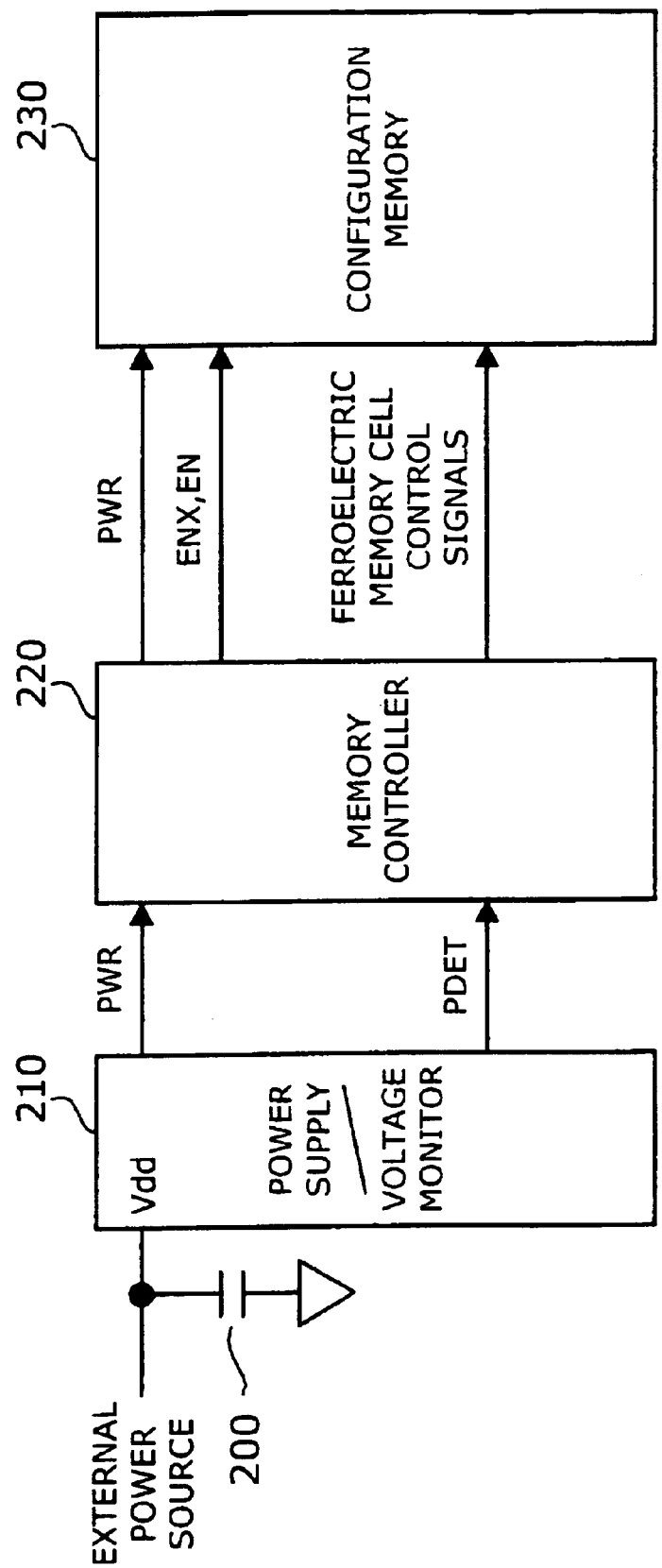
FIG. 22 shows an example of a supply power control system for a ferroelectric memory.
Figure 23:
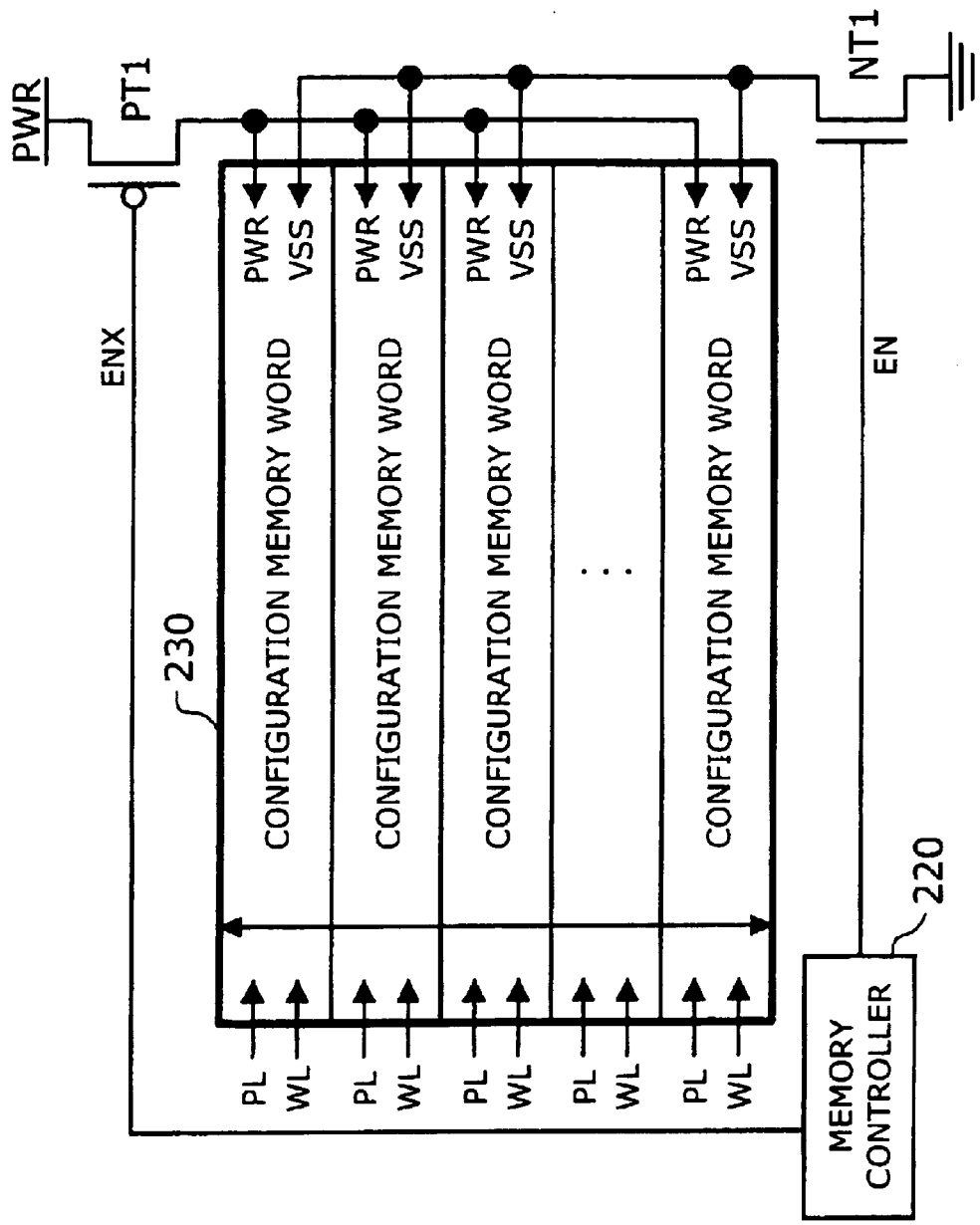
FIG. 23 shows power lines and control signals for ferroelectric configuration memories.

FIG. 22 shows an example of a supply power control system for ferroelectric memories, and FIG. 23 shows power lines and control signals for ferroelectric configuration memories. The illustrated supply power control system has a power supply/voltage monitor 210 with a smoothing capacitor 200 at its input, to which a source voltage Vdd is provided from an external power source. This power supply/voltage monitor 210 produces a supply voltage PWR from the source voltage Vdd, besides generating a power detection signal PDET by detecting rising and falling edges of the source voltage Vdd. Both PWR and PDET are sent to a memory controller 220. The memory controller 220 provides a ferroelectric configuration memory 230 with a power supply control signal ENX and a ground control signal EN, together with the supply voltage PWR and other ferroelectric memory cell control signals. The memory controller 220 and configuration memory 230 in FIG. 22 correspond to the memory controller 22 and configuration memory words 23-0 to 23-7 in FIG. 3, respectively.

The configuration memory 230 is an array of ferroelectric memory cells (FIGS. 6 and 7) as shown in FIG. 23. Its power line is connected to PWR via a p-channel transistor PT1, while its ground line VSS is grounded via an n-channel transistor NT1. When the device is powered up, the memory controller 220 initially turns off both transistors PT1 and NT1. It controls the plate lines of ferroelectric capacitors in an appropriate way before applying PWR upon confirmation of a sufficient voltage level of Vdd at the power supply/voltage monitor 210. More specifically, for the first type of ferroelectric memory cells (FIG. 6), the memory controller 220 drives their plate line PL from low to high. For the second type of ferroelectric memory cells (FIG. 7), the memory controller 220 drives their first plate line PL1 from low to high, while keeping the second plate line PL2 at a ground level (GND). As a result, the storage nodes S1 and S2 of each ferroelectric memory cell are set to proper voltage levels that reflect the previous cell state before the power is lost.

For example, think of a first-type memory cell (FIG. 6) with the original storage node potentials of 0 volts at S1 and 3.3 volts at S2. By driving its plate line PL from low to high, a voltage of 3.00 volts appears at S1, and 3.22 volts at S2, for example. For another example, consider that a second-type memory cell (FIG. 7) originally had the storage node potentials of 0 volts at S1 and 3.3 volts at S2. By driving its first plate line PL1 from low to high, a voltage of 0.65 volts appears at S1, and 2.59 volts at S2. After that, the memory controller 220 asserts the power supply control signal ENX and ground control signal EN to turn on the two transistors PT1 and NT1, which provides the configuration memory 230 with a supply voltage PWR. The latch in each ferroelectric memory cell is thus activated, restoring its original state. Now that the configuration data is ready, the programmable logic device 10 can start the programmed logic functions upon negation of a reset signal to the chip.

The power supply/voltage monitor 210 detects a drop in the supply voltage upon shutdown, which causes the memory controller 220 to fully drive the plate line PL (PL1, PL2) so as to store the data in all ferroelectric memory cells. More specifically, the plate line is driven from its normal level (Vdd/2) to a high level (Vdd) and then to a low level (Vss). Or alternatively, it is driven from its normal level (Vdd/2) to a low level (Vss), then to a high level (Vdd), and back to the low level (Vss). The memory controller 220 then turns off the transistors PT1 and NT1 to de-energize the cells. Preferably all word lines WL are set to low during the above operation (although there would be no harm in making only one word line selected).

Figure 24:
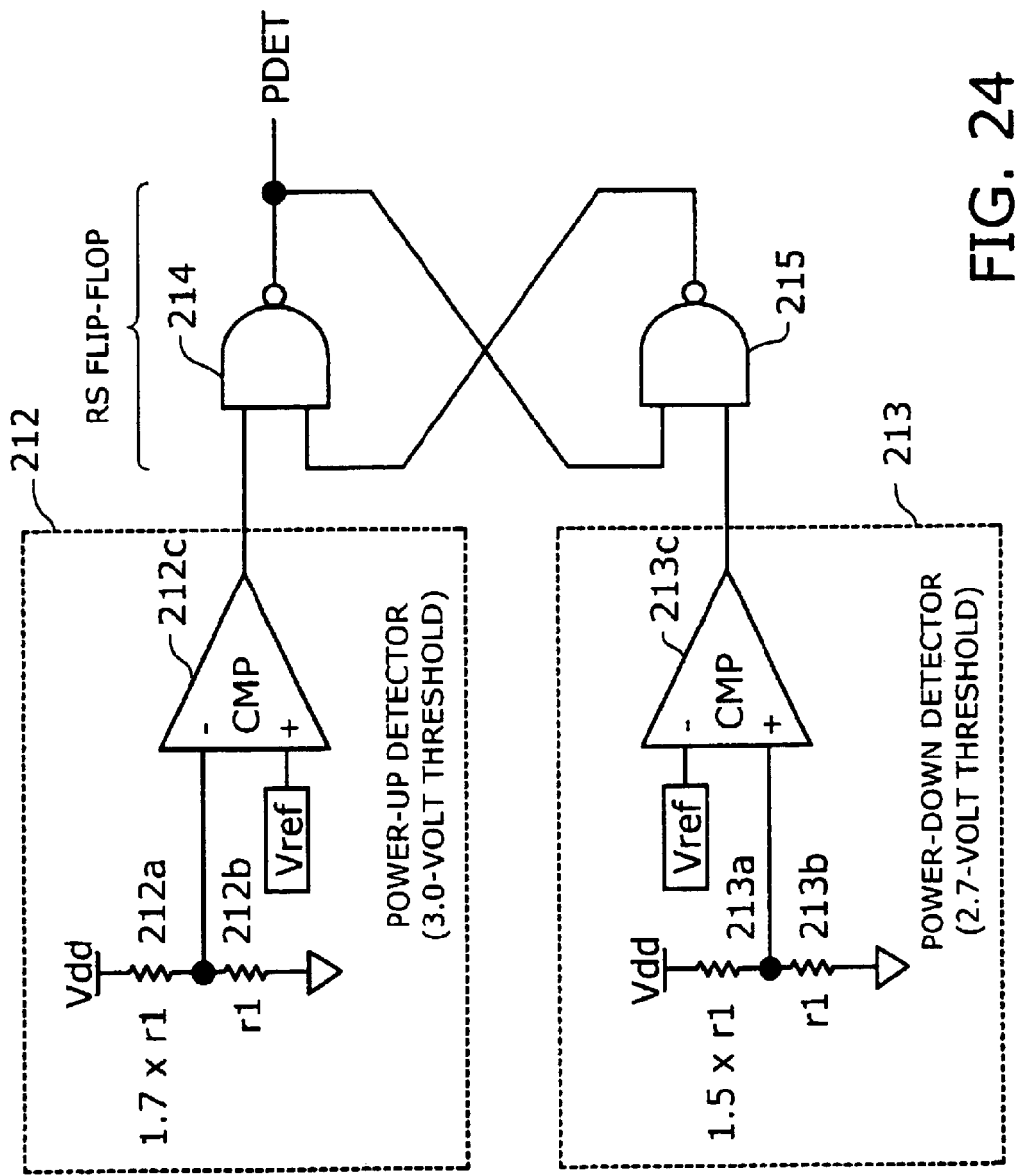
FIG. 24 is a schematic diagram of a source voltage monitor circuit included in a power supply/voltage monitor.

FIG. 24 is a schematic diagram of a source voltage monitor circuit included in the power supply/voltage monitor 210. This circuit is composed of a power-up detector 212 that detects a rising edge of the supply voltage, a power-down detector 213 that detects a falling edge of the supply voltage, and two NAND gates 214 and 215 constituting an RS flip-flop. The source voltage monitor circuit is required to operate at one volt, for example, which is sufficiently lower than the nominal supply voltage Vdd.

The power-up detector 212 is composed of two resistors 212a (1.7×r1) and 212b (r1) connected in series and a comparator 212c. The resistors 212a and 212b divide a given source voltage Vdd by the ratio of 1.7:1, and the comparator 212c compares the divided voltage with a predetermined reference voltage Vref. When the source voltage Vdd reaches 3.0 volts, the comparator 212c generates a low level output, thereby setting the RS flip-flop and making PDET high. Similarly, the power-down detector 213 is composed of two resistors 213a (1.5×r1) and 213b (r1) connected in series and a comparator 213c. The resistors 213a and 213b divide a given source voltage Vdd by the ratio of 1.5:1, and the comparator 213c compares the divided voltage with the reference voltage Vref. When the source voltage Vdd falls below 2.7 volts, the comparator 213c generates a low level output, thereby resetting the RS flip-flop and making PDET low. The reference voltage Vref is supplied by, for example, a band-gap reference circuit that produces a very stable voltage of 1.1 volts, despite the fluctuations in supply voltage or variations in ambient temperature.

As can be seen from the above explanation, the source voltage monitor circuit asserts the power detection signal PDET to high when the source voltage has reached 3.0 volts and holds that state of PDET until the source voltage falls below 2.7 volts. This hysteresis makes the circuit more resilient to instantaneous voltage drops due to an increased power load.

Figure 25:
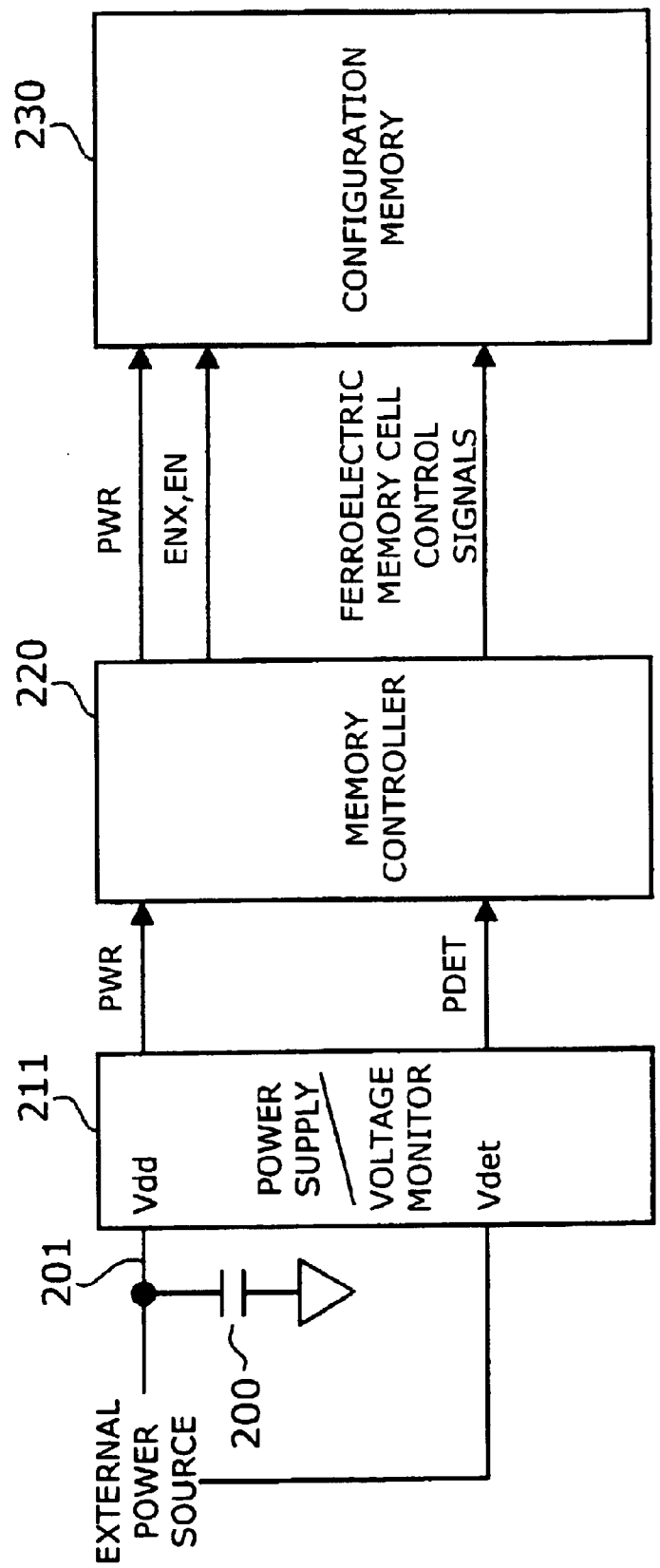
FIG. 25 shows another example of a supply power control system for ferroelectric memories.

While the power supply/voltage monitor 210 watches a supply voltage Vdd in the arrangement shown in FIG. 22, the circuit may be modified slightly as shown in FIG. 25. This alternative power supply/voltage monitor 211 has a dedicated voltage monitor input Vdet to which the supply voltage is routed directly from its original source, avoiding the effect of the smoothing capacitor 200. The power supply/voltage monitor 211 contains a source voltage monitor circuit that is similar to what we have explained in FIG. 24. The source voltage monitor circuit, in this case, watches Vdet, instead of Vdd. The power supply/voltage monitor 211 supplies the memory controller 220 with a power detection signal PDET.

Figure 26:
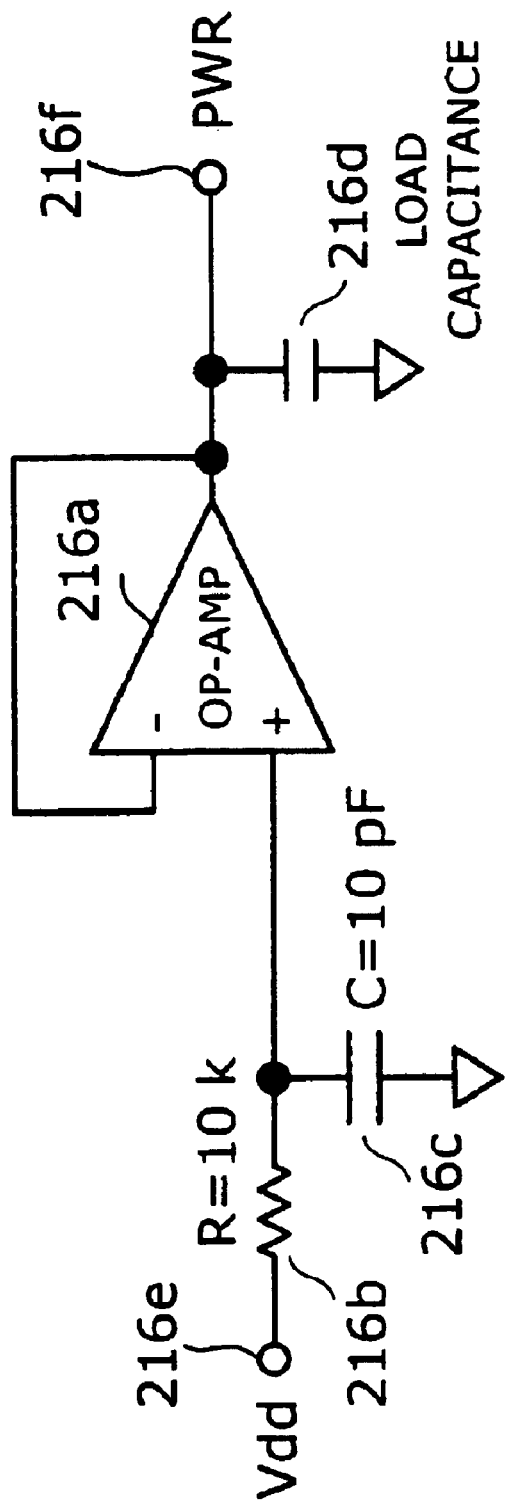
FIG. 26 is a schematic diagram of a power supply circuit.

FIG. 26 is a schematic diagram of a power supply circuit with a slew rate control capability for use in the power supply/voltage monitor 210 (or 211). There is an operational amplifier 216a configured as a voltage follower, the output being directly fed back to the inverting input. This operational amplifier 216a is designed to offer full rail-to-rail operation. Its non-inverting input is connected to a source voltage terminal 216e (Vdd) through a CR network of a capacitor C 216c and a resistor R 216b. With the CR network placed at the input, the operational amplifier 216a outputs an SRAM cell drive voltage PWR at a slower rate than that of its source. The capacitor shown at the amplifier output, or the PWR terminal 216f, is load capacitance 216d.

In the example of FIG. 26, the circuit gives a time constant of 100 nanoseconds for supply voltage control, with the circuit parameters of C=10 pF and R=10 kΩ. This power-up time constant depends on the characteristics of ferroelectric capacitors in a memory cell, and an appropriate value should be selected according to what ferroelectric material is used for them. The time constant of 100 nanoseconds is a typical operating condition for PZT.

Figure 27:
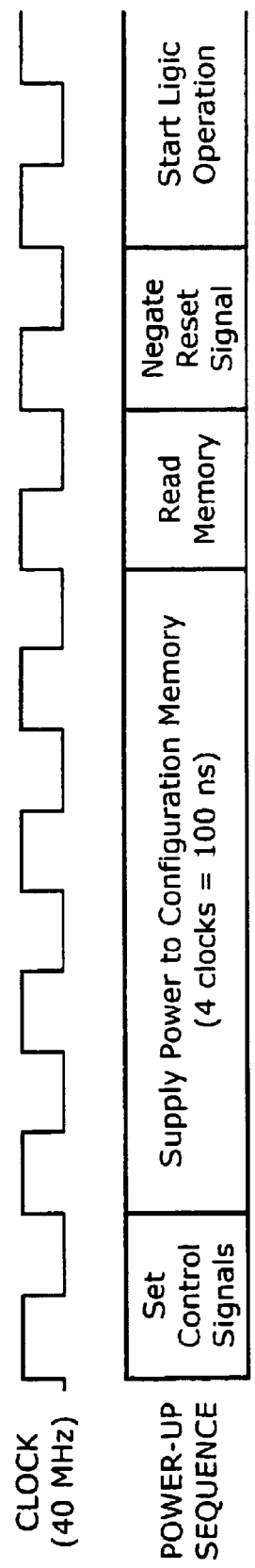
FIG. 27 shows an example of a power-up control sequence.

FIG. 27 shows an example of a control sequence at power-up of the ferroelectric memory cells discussed in FIGS. 6 and 7. This sequence begins with setting up various control signals. FIG. 28 shows the state of control signals before the ferroelectric memories are powered up. As seen, the supply voltage PWR is initially turned off, and the write enable signal WE, word line control signals WL, and plate line control signals PL are all set to low for safety. Referring back to FIG. 27, the sequence proceeds at a clock frequency of 40 MHz. The subsequent four clocks (i.e., 100 nanoseconds) are used to energize the power line of configuration memories. After the supply voltage has reached its nominal level, configuration data is read out of the configuration memories, with which the look-up tables, programmable interconnections, and programmable I/O blocks become ready to operate. The device is then released from its reset state, thus starting the intended logic operation. Note that the power-up sequence of FIG. 27 is merely an example; the clock frequency and the number of clock cycles necessary for enabling power supply depend on what kind of ferroelectric material is used.

Figure 29:
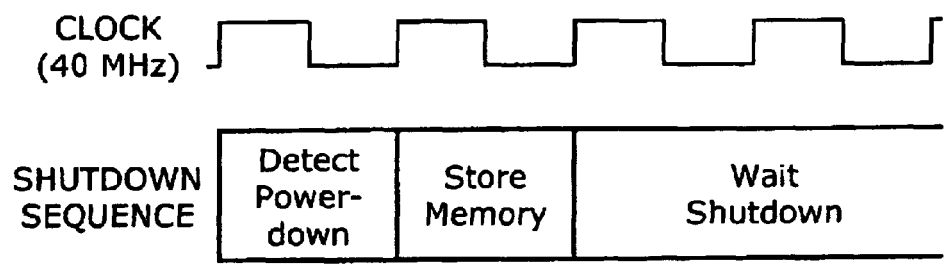
FIG. 29 shows an example of a power-down control sequence.

FIG. 29 shows an example of a power-down control sequence for ferroelectric memories. Upon detection of power-down, the device stores all the data in its configuration memories and then enters to the state waiting for shutdown. More specifically, the foregoing power-down monitor detects a power-down event when the source voltage Vdd at its voltage monitor input Vdet falls below a predetermined threshold (e.g., 2.7 V). Recall that the system of FIG. 25 receives a raw source supply voltage from the external power source for the purpose of power-up/power-down detection, detouring around a smoothing capacitor 200 connected to the source voltage Vdd. In a power-down situation, the potential of Vdet falls immediately, as opposed to the potential of the power line 201, which falls slowly due to the effect of the smoothing capacitor 200. That is, since it watches Vdet, the source voltage monitor circuit can identify a power-down event earlier than the supply voltage Vdd actually drops. In the case, for example, that the smoothing capacitor 200 is 0.1 µF and the device consumes 100 mA, it takes 200 nanoseconds for the voltage drop to reach 0.2 volts. This time length is equivalent to eight cycles of 40-MHz clock, which is long enough for the device to store all configuration data in ferroelectric capacitors.

FIG. 30 is a table that shows the state of control signals in each step of the power down sequence of FIG. 29. Upon negation of the power detection signal PDET, the device stores all data in its configuration memories by changing the plate line control signal PL from high to low, for example, while keeping both write control signal WE and word line control signals WL at a low level and the power for ferroelectric SRAM cells turned on. This operation applies a full supply voltage to the ferroelectric capacitors. In the subsequent wait state, the plate line PL stays at a low level, as are the other control signals WE, until the power PWR is lost.

With the memory control mechanism described above in FIGS. 22 to 30, the proposed programmable logic device gives a delay to the supply voltage PWR for ferroelectric SRAM cells in its configuration memories with an appropriate time constant that is determined in accordance with the characteristics of ferroelectric capacitors. This delay permits the device to control plate lines of ferroelectric memory cells upon power-up, thus ensuring successful recalling of the data stored in each ferroelectric capacitor. The proposed mechanism also ensures short-term and long-term reliability of stored data by applying a full supply voltage PWR to ferroelectric memory cells upon detecting a drop of the power source voltage.

CONCLUSION

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A programmable logic device which performs logic functions according to given configuration data, comprising:
   a combinational logic block configured with the given configuration data;
   a flip-flop with an enable input to which the given configuration data is supplied, said flip-flop latching an output of said combinational logic block when the enable input is asserted;
   a multiplexer which selects the output of either said combinational logic block or said flip-flop according to the given configuration data; and
   a circuit which asserts the enable input of said flip-flop when said multiplexer selects the output of said flip-flop, and negates the enable input when said multiplexer selects the output of said combinational logic block.

2. The programmable logic device according to claim 1, wherein the output of said flip-flop is fed back to said combinational logic block as an input signal therefor.

3. A programmable logic device which performs logic functions according to given configuration data, comprising:
   a programmable logic block which provides a logic function as programmed;
   a configuration memory composed of non-volatile ferroelectric memory cells which stores configuration data;
   a memory, composed of at least one non-volatile ferroelectric memory cell, which stores information that indicates whether said configuration memory has already been loaded with the configuration data; and
   a control circuit which disables outputs of said programmable logic block when the information in said memory indicates that said configuration memory has not been loaded.

4. A programmable logic device, comprising: a programmable logic block which provides a logic function as programmed;
   a configuration memory composed of non-volatile ferroelectric memory cells which stores configuration data that defines the logic function of said programmable logic block;
   a security data storage area which is provided as part of said configuration memory to store a security identifier; and
   an authentication processor which authenticates a request related to said configuration memory by using the security data stored in said security data storage area.

5. The programmable logic device according to claim 4, wherein said request is intended for reading or writing the configuration data in said configuration memory.

6. The programmable logic device according to claim 4, wherein said request is intended for making the programmable logic block to start operation as defined by the configuration data in said configuration memory.

7. A programmable logic device which performs logic functions according to given configuration data, comprising:
   a programmable logic block which provides a logic 20 function as programmed;
   a plurality of configuration memories, each composed of non-volatile ferroelectric memory cells, which store a plurality of configuration data sets;
   a data selector which selects one of the plurality of configuration data sets for use in said programmable logic block to define the logic function thereof, whereby said programmable logic block operates in various ways,
   a security data storage area which is provided as part of said configuration memories to store a security identifier; and
   an authentication processor which authenticates a request related to said configuration memories by using the security identifier stored in said security data storage area.

8. The programmable logic device according to claim 7, wherein said request is a request for read access to said configuration memories.

9. The programmable logic device according to claim 7, wherein said request is a request for write access to said configuration memories.

10. The programmable logic device according to claim 7, wherein said request is a request for use of said configuration memories to make the programmable logic device start up.

11. The programmable logic device according to claim 7, wherein: said configuration memories are divided into a plurality of groups; and the security identifier is assigned to each individual group of configuration memories.

12. A programmable logic device, comprising: a programmable logic block which provides a logic function as programmed;

a configuration memory composed of non-volatile ferroelectric memory cells which stores configuration data that defines the logic function of said programmable logic block;

a supply voltage monitor which produces a detection signal when a supply voltage has reached a predetermined threshold voltage; and a memory controller which supplies power to said ferroelectric memory cells after applying a high-level voltage to a plate line of said ferroelectric memory cells in response to the detection signal from said supply voltage monitor.

13. A programmable logic device, comprising:

a programmable logic block which provides a logic function as programmed;

a configuration memory composed of non-volatile ferroelectric memory cells which stores configuration data that defines the logic function of said programmable logic block;

a power supply circuit which provides power to said ferroelectric memory cells, by delaying a given supply voltage with a time constant that is suitable for said ferroelectric memory cells.

14. The programmable logic device according to claim 13, wherein said power supply circuit comprises:

a CR network having a resistor and a capacitor; and an operational amplifier, coupled to said CR network, which produces a voltage for operating the memory cells.

15. A programmable logic device, comprising:

a programmable logic block which provides a logic function as programmed;

a configuration memory composed of non-volatile ferroelectric memory cells which stores configuration data that defines the logic function of said programmable logic block; a supply voltage monitor which produces a detection signal when a supply voltage has fallen below a predetermined threshold voltage; and a memory controller which removes power from said ferroelectric memory cells, after applying a first plate line voltage to a plate line of said ferroelectric memory cells in response to the detection signal from said supply voltage monitor and then applying thereto a second plate line voltage, so as to store the configuration data in said ferroelectric memory cells.

16. The programmable logic device according to claim 15, wherein the first plate line voltage is higher than the second plate line voltage.

17. The programmable logic device according to claim 15, wherein the second plate line voltage is higher than the first plate line voltage.

18. The programmable logic device according to claim 15, wherein:

the supply voltage is supplied from an external source to the programmable logic device through a first supply path with a smoothing capacitor attached thereto, as well as through a second supply path without smoothing capacitors;

said memory controller controls power for said ferroelectric memory cells by switching the supply voltage supplied through the first supply path; and said supply voltage monitor watches the supply voltage provided through the second supply path.

19. A programmable logic device which performs logic functions according to given configuration data, comprising:

a programmable logic block which provides a logic function as programmed;

a plurality of configuration memories, each composed of non-volatile ferroelectric memory cells, which store a plurality of configuration data sets; and a data selector which selects one of the plurality of configuration data sets for use in said programmable logic block to define the logic function thereof, whereby said programmable logic block operates in various ways, depending on which configuration data is selected;

wherein said data selector changes the selection to another configuration data set in response to an event signal that is produced by said programmable logic block in operation or supplied from an external source while said programmable logic block is in operation.

20. A programmable logic device which performs logic functions according to given configuration data, comprising:

a programmable logic block which provides a logic function as programmed;

a plurality of configuration memories, each composed of non-volatile ferroelectric memory cells, which store a plurality of configuration data sets;

a data selector which selects one of the plurality of configuration data sets for use in said programmable logic block to define the logic function thereof, whereby said programmable logic block operates in various ways, depending on which configuration data is selected; and a read-only memory controller which enables said programmable logic block to make access to one of said configuration memories for reference as a read-only memory.

21. The programmable logic device according to claim 20, wherein said read-only memory controller enables said programmable logic block to make access to said configuration memories other than the one that is currently selected by said data selector, in response to a control signal supplied from said programmable logic block.

22. A programmable logic device which performs logic functions according to given configuration data, comprising:

a programmable logic block which provides a logic function as programmed;

a plurality of configuration memories, each composed of non-volatile ferroelectric memory cells, which store a plurality of configuration data sets; and a data selector which selects one of the plurality of configuration data sets for use in said programmable logic block to define the logic function thereof, whereby said programmable logic block operates in various ways, depending on which configuration data is selected; wherein:

said plurality of configuration memories are divided into a plurality of groups; and said plurality of groups of configuration memories receive or output a plurality of configuration data streams concurrently.

23. A programmable logic device which performs logic functions according to given configuration data, comprising:

a programmable logic block which provides a logic function as programmed;

composed of non-volatile ferroelectric memory cells, which store a plurality of configuration data sets; and a data selector which selects one of the plurality of configuration data sets for use in said programmable logic block to define the logic function thereof, whereby said programmable logic block operates in various ways, depending on which configuration data is selected;

wherein:

said configuration memories are divided into a plurality of groups; and at least one of said plurality of groups of configuration memories receives a configuration data stream from an external source in the background.

* * * * *